(12) United States Patent
Niedermeier et al.

(10) Patent No.: US 11,649,857 B2
(45) Date of Patent: May 16, 2023

(54) BALL BEARING CAGE AND BALL BEARING

(71) Applicant: GEBR. REINFURT GMBH & CO. KG, Rimpar (DE)

(72) Inventors: Herbert Niedermeier, Poppenhausen (DE); Daniel Armani, Burggrumbach (DE)

(73) Assignee: Gebr. Reinfurt GmbH & Co. KG, Rimpar (DE)

( * ) Notice: Subject to any disclaimer, the term of this patent is extended or adjusted under 35 U.S.C. 154(b) by 0 days.

(21) Appl. No.: 16/966,553

(22) PCT Filed: Jan. 30, 2019

(86) PCT No.: PCT/DE2019/100097
§ 371 (c)(1),
(2) Date: Jul. 31, 2020

(87) PCT Pub. No.: WO2019/149318
PCT Pub. Date: Aug. 8, 2019

(65) Prior Publication Data
US 2021/0048068 A1 Feb. 18, 2021

(30) Foreign Application Priority Data
Feb. 1, 2018 (DE) .......................... 102018102275.1

(51) Int. Cl.
*F16C 33/38* (2006.01)
*F16C 43/06* (2006.01)
*F16C 19/06* (2006.01)

(52) U.S. Cl.
CPC .......... *F16C 33/3862* (2013.01); *F16C 19/06* (2013.01); *F16C 43/06* (2013.01)

(58) Field of Classification Search
CPC .............. F16C 33/3818; F16C 33/3862; F16C 33/3868; F16C 33/3875; F16C 33/3887; F16C 33/49; F16C 43/06; F16C 43/065
See application file for complete search history.

(56) References Cited

U.S. PATENT DOCUMENTS

| 822,723 | A | * | 6/1906 | Conrad | ................... F16C 43/06 384/510 |
| 1,507,586 | A | | 9/1924 | Cooper | |

(Continued)

FOREIGN PATENT DOCUMENTS

| AT | 265762 B | 10/1968 |
| DE | 2416282 A1 | 10/1975 |

(Continued)

OTHER PUBLICATIONS

Translaton of AT265762 obtained Oct. 14, 2021.*
Translation of JP2009-115128 obtained Oct. 14, 2021.*

*Primary Examiner* — James Pilkington
(74) *Attorney, Agent, or Firm* — Laurence A. Greenberg; Werner H. Stemer; Ralph E. Locher

(57) ABSTRACT

A two-part ball bearing cage includes two, in particular at least substantially identical, cage parts forming an even-numbered plurality of ball pockets for receiving a corresponding number of balls having a predeterminable ball diameter. Each cage part has an annular body on which substantially evenly distributed webs are disposed in the circumferential direction to form the ball pockets. A distance in the circumferential direction between two webs that are adjacent in the circumferential direction approximately corresponds to the sum of twice the ball diameter and a width of the web in the circumferential direction. A ball bearing having the ball bearing cage and a method for assembly of the ball bearing are also provided.

14 Claims, 16 Drawing Sheets

(56) References Cited

U.S. PATENT DOCUMENTS

| | | | | |
|---|---|---|---|---|
| 3,285,099 | A | * 11/1966 | Parks, Jr. | F16C 33/44 |
| | | | | 74/640 |
| 3,370,900 | A | 2/1968 | Messerschmidt | |
| 6,113,278 | A | * 9/2000 | Ohira | F16C 33/416 |
| | | | | 384/527 |
| 8,814,437 | B2 | 8/2014 | Braun | |
| 9,670,958 | B2 | * 6/2017 | Maeda | F16C 33/416 |
| 10,197,096 | B2 | 2/2019 | Niedermeier | |
| 10,634,192 | B2 | 4/2020 | Yoshiwara et al. | |
| 2011/0299805 | A1 | * 12/2011 | Damato | F16C 43/04 |
| | | | | 384/531 |

FOREIGN PATENT DOCUMENTS

| | | |
|---|---|---|
| DE | 8903768 U1 | 5/1989 |
| DE | 69925976 T2 | 5/2006 |
| DE | 102010034962 A1 | 2/2012 |
| DE | 102014008763 B4 | 2/2016 |
| EP | 0220755 A1 | 5/1987 |
| GB | 1495427 A | 12/1977 |
| JP | S5293851 A | 8/1977 |
| JP | H06165790 A | 6/1994 |
| JP | H09049525 A | 2/1997 |
| JP | H09229073 A | 9/1997 |
| JP | 2000291662 A | 10/2000 |
| JP | 2002147463 A | 5/2002 |
| JP | 2008121817 A | 5/2008 |
| JP | 2008128296 A | 6/2008 |
| JP | 2009115128 A | 5/2009 |
| JP | 2010060001 A | 3/2010 |
| JP | 2014047865 A | 3/2014 |
| JP | 2017517682 A | 6/2017 |
| JP | 2017194141 A | 10/2017 |
| WO | 2011098357 A1 | 8/2011 |
| WO | 2017047727 A1 | 3/2017 |

* cited by examiner

BALL BEARING CAGE AND BALL BEARING

BACKGROUND OF THE INVENTION

Field of the Invention

The invention relates to a ball bearing cage and to a ball bearing with such a ball bearing cage.

Roller bearings are bearings where bodies, i.e. rolling bodies, rolling between a so-called inner ring and an outer ring reduce friction resistance. They serve as fixing for axles and shafts, absorbing radial and/or axial forces, depending on the design, and at the same time enabling rotation of the shaft or of the components mounted in this manner on an axle, for example a wheel.

Ball bearings are a subgroup of such roller bearings where balls serve as rolling bodies (other roller bearing subgroups, for example, are cylindrical roller bearings, taper roller bearings, needle bearings, spherical roller bearings or toroidal roller bearings—in each case with corresponding rolling bodies such as cylinder rollers, tapered rollers, etc.).

Ball bearing cages for arranging the individual balls of a ball bearing or a ball set (i.e. all balls arranged in a circumferential row in a ball bearing) of a ball bearing are also known and have the task of holding the balls (of the ball set in the ball bearing) in position in the circumferential direction of the ball bearing at approximately identical distances. In this case or to this end, the balls are each received in so-called ball pockets configured by the ball bearing cage.

Various realizations of such ball bearing cages are also known, such as, for example, window cages (occasionally also called solid cages) and single-part or two-part snap cages.

In the case of a window cage of a ball bearing, the rolling bodies, i.e. the balls, are inserted into closed profiles, i.e. the ball pockets, configured—as a rule in one piece—by the window cage.

In contrast, the balls in the case of a snap cage of a ball bearing are held in position by webs—which are arranged on a ring-shaped body, a so-called cage back, so as to project axially, and are distributed substantially uniformly in the circumferential direction of the ball bearing. In each case two webs arranged adjacent in the circumferential direction of the ball bearing realize, in this case, in the case of such a snap cage, a ball pocket for receiving a or the ball, the snap opening of which—because it is not configured as a closed profile, i.e. the "free" distance" between two web ends adjacent in the circumferential direction of the ball bearing, is, as a rule, smaller than a respective ball diameter of the ball received in the ball pocket (the mean distance in each case between two webs adjacent in the circumferential direction corresponds in the circumferential direction approximately to the ball diameter), as a result of which the ball pocket or the ball bearing cage—when the ball bearing is mounted—"snaps in" over the ball.

Two-part snap cages provide, in addition to the—then first—cage part, i.e. the cage back provided with the protruding webs, a second cage part which forms a counterpart thereto and—also mostly configured as a ring-shaped part—"closes/locks" the snap openings of the first cage part—and strengthens/reinforces the first cage part.

In the case of such ball bearing cages with such ball pockets, a so-called ball pocket play has a great significance with reference to the wear behaviour of the ball bearing cage. The ball pocket play is defined as axial mobility of the ball and the mobility of the ball in the circumferential direction of the ball bearing cage in the ball pocket. Put clearly or put more simply, if the ball pocket simulates approximately the—maximum—cross section of the ball, the ball pocket play is thus the axial enlargement thereof ("enlarged (pocket) width") and/or enlargement in the circumferential direction ("elongated hole") beyond the approximately maximum ball cross section.

As a result of so-called misalignment errors of the bearing or the ball bearing in a housing or in the case of bearing positions tilting, the balls of a ball set can move at different speeds. This results in leading or trailing balls wanting to move away from the position of the ball pocket and accordingly exerting forces onto the ball bearing cage in the circumferential direction of the ball bearing which—in the case of a snap cage—have to be absorbed by the webs and the cage back.

This can lead there to excessive wear in the ball pockets of the snap cage of a ball bearing—and in the least favorable case, to a break in the cage back. At the time of such a cage back break, the (snap) cage acts as a shoe brake as a result of the centrifugal forces acting on it so that the bearing or ball bearing immediately fails.

DE 699 25 976 T2 discloses a radial deep groove ball bearing with a two-part snap cage. Said two-part snap cage has two identically designed individual or cage parts/cage halves, the two cage halves, after assembly, snapping against one another in the ball set—and the snap openings of the ball pockets being locked or closed in this manner.

A disadvantage of said cage design of the two-part snap cage disclosed in DE 699 25 976 T2, however, is that for manufacturing reasons it cannot be installed in a miniature ball bearing, as used, for example in dental applications, in particular in the case of dental turbines. A snap cage for a ball bearing of a dental turbine comprises—for example—dimensions of approximately 4 mm inside diameter, 5 mm outside diameter and approximately 1.6 mm width. The snap mechanism described in DE 699 25 976 T2 or the cage design described therein cannot be realized for said dimensioning of a cage that is usable in this case.

SUMMARY OF THE INVENTION

The object underlying the invention is to overcome the disadvantages and restrictions in the prior art. In particular, the object underlying the invention is to provide a ball bearing cage with improved wear behavior and a structural design, through which design significantly lower loads act on the cage back when the ball bearing runs in a tilted manner so that a cage break can be avoided.

In particular, the object underlying the invention is also to provide a ball bearing cage with realizable cage dimensions for the (application) area of miniature ball bearings, in particular for dental applications.

Said objects are achieved by a ball bearing cage and a ball bearing with the features according to the respective independent claim.

The ball bearing cage, i.e. a two-part ball bearing cage (designated below mostly only as "the ball bearing cage" in a simplified manner) has two, in particular at least substantially identical, cage parts, which—with the ball bearing cage mounted—realize an even-numbered plurality of ball pockets for receiving a corresponding number of balls with a predefinable ball diameter. I.e. each—(with the ball bearing cage mounted)—ball pocket can receive or serves for receiving one ball.

"Two-part", in this case, (only) refers to the two cage parts (as parts of the ball bearing cage)—and does not exclude the ball bearing cage (itself or as a whole) comprising further parts and/or the cage parts themselves each also having further parts.

Each cage part of said ball bearing cage additionally comprises a ring-shaped body ("cage back"), on which are arranged—in the circumferential direction of the cage part or of the ball bearing cage—substantially uniformly distributed, in particular substantially identically configured, webs for realizing the ball pockets.

Put simply and clearly, webs, which project axially (i.e. the extension of a ball pocket in the axial direction of the two-part ball bearing cage, or the width direction of the ball bearing cage) and which delimit the ball pockets that they realize at least substantially in the circumferential direction, are arranged in each case on the ring-shaped body or cage back of the respective cage part—uniformly distributed in the circumferential direction.

The webs can comprise, in particular, a biconcave form, the bulges/curvatures of which are adapted ("inwardly") to the form of the balls ("circle/circular arc").

A distance—in the circumferential direction of the cage part or of the ball bearing cage—between in each case two webs adjacent in the circumferential direction corresponds, in this case, approximately to the sum of twice the ball diameter and a width of the or of such a web in the circumferential direction.

Said "distance" between the two webs adjacent in the circumferential direction is dimensioned, i.e. can be measured, in particular at an axial, i.e. the extension of a ball pocket in the axial direction of the two-part ball bearing cage, center of a ball pocket and—approximately—at a central radial, i.e. the extension of a web radially toward or away from a center point M of the two-part ball bearing cage, height of a web or of the webs—and is the length of the corresponding circular arc realized between the two webs in this connection (cf. FIG. 1).

The "width" of a web means, in particular, the extension thereof, simply put a (circular arc) length, in the circumferential direction of the two-part ball bearing cage (cf. FIG. 1).

The expression "approximately" the sum can convey that when totaling/dimensioning the distance—from twice the ball diameter and the width of the or of such a web in the circumferential direction—tolerances can also occur, in particular, however, a ball pocket play can also be included in the calculation or taken into consideration.

Put clearly and simply, in each case two webs of the ball bearing cage adjacent in the circumferential direction (arranged on the ring-shaped body or on the cage back of the respective cage part) are spaced apart or are distanced from one another (by such an amount)—in the circumferential direction—to the extent that between them (with the ball bearing cage mounted) two ball pockets can be formed (consequently also the even-numbered plurality of ball pockets in the case of the two-part ball bearing cage), namely then or namely by—the two cage parts snapping against one another in a ball set during or after mounting the two-part ball bearing cage—one web of the cage part "entering" axially or coming to rest (approximately centrally) between the two webs of the other cage part adjacent in the circumferential direction.

Put another way, the webs of the one cage part and the webs of the other cage part—with the ball bearing cage in the mounted state—delimit the individual ball pockets in the ball bearing cage in a mutual manner or in each case in an alternating manner.

The ball bearing cage, i.e. the two-part ball bearing cage, thus provides two, in particular at least substantially identical, cage parts ("cage halves"), the two cage parts/cage halves thereof—with the ball bearing cage mounted—being able to snap against one another into a ball set of a ball bearing ("(snap) lock/"snap locking"), the—even-numbered—ball pockets of the ball bearing cage—once the ball bearing cage is or the cage halves are mounted in the ball bearing—being realized in this manner.

If the ball bearing cage, i.e. the two-part ball bearing cage, provides said two cage parts/cage halves as cage parts/cage halves which can be "snapped" against one another into the ball set ("snap cage"), this makes it possible for said "snappable" cage parts/cage halves to be able to be moved (still further) against one another in a variable manner in the circumferential direction of the ball bearing cage or of the ball bearing.

As a result, leading balls of a ball set running in a tilted manner can create an additional space in the circumferential direction (in contrast to the known "integrally formed", fixedly closed profiles/ball pockets which receive the balls in the case of window cages and in the case of the known single-part/two-part snap cages with the "integrally formed", fixed (as regards width and length) ball pockets)—and, as a result, loads on the cage back and the ball pockets of the two cage halves can be minimized.

At the same time, an offset of the two cage parts/cage halves is also possible if one ball bearing tilts in this regard, both cage parts/cage halves being able to be guided in each case on an inner ring shoulder or outer ring shoulder of the respective inner or outer ring of the ball bearing so that lower loads are created for the cage back and ball pockets in this way too.

As a result of the fact that each cage part/cage half of the ball bearing cage can be guided separately on an (inner ring/outer ring) shoulder, vibrations arising can also be damped in an advantageous manner.

It is also advantageous in the case of the ball bearing cage that its design also makes it possible to use it in miniature ball bearings, such as usually ball bearings for dental applications, for example in dental turbines.

The (snap) locking of the two cage parts/cage halves of the (two-part) ball bearing/snap cage can be realized via a narrower—compared to a one-part snap cage—snap opening so that the risk of disassembly during operation of the ball bearing cage is further minimized.

The ball bearing comprises—along with the (two-part) ball bearing cage—an inner raceway, an outer raceway and a plurality of balls with the predefinable ball diameter, the plurality of balls corresponding to the number of ball pockets configured by the (two-part) ball bearing cage ("ball set")—with the ball bearing cage mounted—and in each case one of the balls (of the ball set) is received in one of the ball pockets.

Such a ball bearing—with the (two-part) ball bearing cage—can be, in particular, a radial deep groove ball bearing, an angular contact bearing, an axial deep groove ball bearing, an angular ball bearing, a four point bearing or a magneto bearing.

The outer raceway and/or the inner raceway can be produced, for example, from chromium steel, such as, for example, from 100Cr6 (material number 1.3505), a steel with a content of approximately 1% carbon and 1.5% chromium. Further possible steels—for the outer and/or inner raceway—are, for example, 100CrMn6 and 100CrMo6; the alloy elements manganese (Mn) and molybdenum (Mo) serve here for better hardenability.

For applications of the ball bearing in a corrosive environment, the high-alloyed steels X65Cr13 (material number 1.4037) and X105CrMo17 (material number 1.4125) or X30CrMoN15-1 (material number 1.4108) can be used—for the inner and/or outer raceway. The last steel can also be used, at least for a few days, in the human organism.

For particular operating conditions, the ball bearing can also be provided as a hybrid bearing (two materials), where the raceways or wheel treads, consist of steel and the balls of ceramic, for example in the case of spindle bearings for power tools, or as ceramic bearings where both the wheel treads and the balls consist of ceramic, or also provided as plastic bearings with balls of glass or ceramic, against aggressive acids or leaches in the chemical and food industry.

It can also be provided that the ball bearing cage is realized with the ball bearing as an inner-ring-guided cage or as an outer-ring-guided cage, in particular as an inner-ring-guided cage. In this case, an outer circumference of the ball bearing cage slides along an inner circumference of the outer raceway or an inner circumference of the ball bearing cage along an outer circumference of the inner raceway.

Preferred developments of the invention are also produced from the dependent claims. Developments refer both to the ball bearing cage and to the ball bearing.

It can thus be provided as a development that at least one cage part, in particular each cage part, has a cylindrical outer surface in the axial direction. Said development or said cage design can preferably be used in deep groove ball bearings where spherical lugs do not bend outward due to the speed as a result of the centrifugal forces arising in the ball bearing.

As an alternative to this, it can also be provided that at least one cage part, in particular each cage part, has a conical outer surface in the axial direction, in particular with a cone angle between approximately 2° and approximately 20°, in particular between approximately 7° and approximately 12°. As a result, the spherical lugs can bend outward due to the speed as a result of the centrifugal forces arising in the ball bearing and the then outwardly bent spherical lugs can be prevented from contacting a shoulder or a raceway of the outer raceway.

In addition, it can also be provided as a development that at least one cage part consists at least in part of plastics material, in particular of polyether ether ketone (PEEK), polyether ketone (PEK), polyphenylene sulfide (PPS), polyamideimide (PAI), Polyimide (PI) or phenol resin (PF), in particular cotton-fabric-reinforced phenol resin (PF).

It can also be provided in the case of a development that the two cage parts consist of the same material, for example of a wear-resistant material or a material that has been modified with sliding properties, or of the same materials.

It can also be provided that the two cage parts consist at least in part or completely of different materials. In a preferred manner, it can be provided here, for example, that the first cage part consists of a wear-resistant material and the second cage part of a material that has been modified with sliding properties.

It can additionally also be provided as a development that a distance between the in each case two webs adjacent in the circumferential direction is greater on an outer circumference of the cage part than the distance between the two webs on an inner circumference of the cage part.

Said different distance measurement on the inner or outer circumference results—with the ball bearing cage mounted—in particular in the ball pockets realized (with the bearing cage mounted) having in each case different ball pocket lengths (in the circumferential direction) on the outer circumference or inner circumference of the ball bearing cage (ball pocket with a "funnel shape").

Such a cage design—with a different ball pocket length on the outer circumference or inner circumference of the ball bearing cage—(and the production thereof) is described in DE 10 2014 008 763 B4 (Gebrüder Reinfurt GmbH & Co. KG), 17 Dec. 2015 (date of disclosure), sections [0018] ff.—with FIGS. 5 to 7 and 10 or FIGS. 15 to 17 and 20 there in particular for a one-part inner-ring-guided or outer-ring-guided snap cage, the contents of which, in this connection, are thus a component part of the present realizations (described in DE 10 2014 008 763 B4 with "the length of the ball pocket on the outer circumference of the ball bearing cage is greater than the length of the ball pocket on the inner circumference of the ball bearing cage." (cf. [0028] of DE 10 2014 008 763 B4).

The ball bearing cage can preferably be produced or is produced by shape cutting, by additive manufacturing, in particular by 3D printing, or by injection molding.

It can preferably also be provided that the ball bearing cage is inserted or used in a single-row radial deep groove ball bearing.

It can preferably also be provided that the ball bearing cage is applied or used for/in high-speed applications such as, for example, in dental technology, for example in a dental turbine, at a speed parameter within the range of approximately $n' dm \geq 1000000$ mm/min, n corresponding to a speed of the inner raceway and dm corresponding to a mean bearing diameter. The mean bearing diameter dm is calculated as an average value between an outer diameter and a bore diameter of the ball bearing.

It can be provided in the case of a development that the balls of the ball bearing (with the ball bearing cage) comprise the pre-definable ball diameter of less than 5 mm.

The ball bearing (and/or ball bearing cage) can preferably be used or is used in a dental instrument, in particular in a dental turbine.

Assembly of the ball bearing—having the ball bearing cage—is preferably effected according to the following steps as follows:

the balls are moved into the outer raceway abutting against one another, the inner raceway is first of all added into the outer raceway from an eccentric position and moved into an approximately concentric position in the outer raceway, the balls are distributed such that they are at approximately identical distances from one another in the circumferential direction, the two cage parts are inserted one after the other between the inner and the outer raceway from both sides, wherein they snap into the ball set against one another.

The description of advantageous designs of the invention provided up to now includes numerous features which are reproduced in part in the individual subclaims and are combined to form multiple features. However, said features will expediently also be looked at individually by the expert and combined to form sensible further combinations.

The above-described characteristics, features and advantages of said invention and the manner in which these are achieved become clearer and more readily comprehensible in conjunction with the following description of one or multiple exemplary embodiments which will be explained in more detail in connection with the figures.

The invention, however, is not limited to the combination of features specified in the exemplary embodiment or embodiments, neither with reference to functional features. Suitable features of every exemplary embodiment can thus also be considered in an isolated manner for this purpose, removed from one exemplary embodiment and moved into another exemplary embodiment in order to supplement the same.

Identical parts, components and the like are characterized by identical reference symbols in the figures. Dot-dash lines illustrate sections; solid lines (continuous lines) point toward edges.

DETAILED DESCRIPTION OF THE INVENTION

Figure 1:
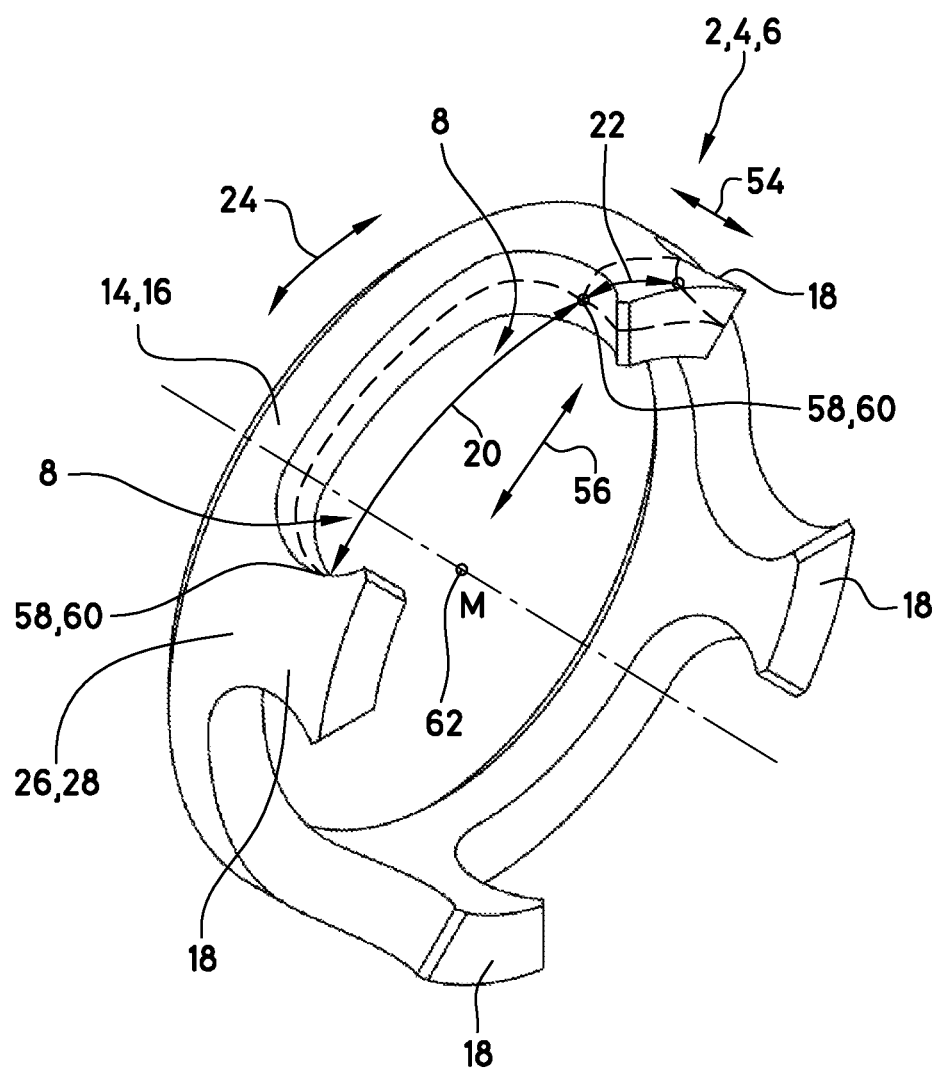
FIG. 1 shows the one cage half of a two-part snap cage with two identical cage halves according to a first realization (in perspective)
Figure 2:
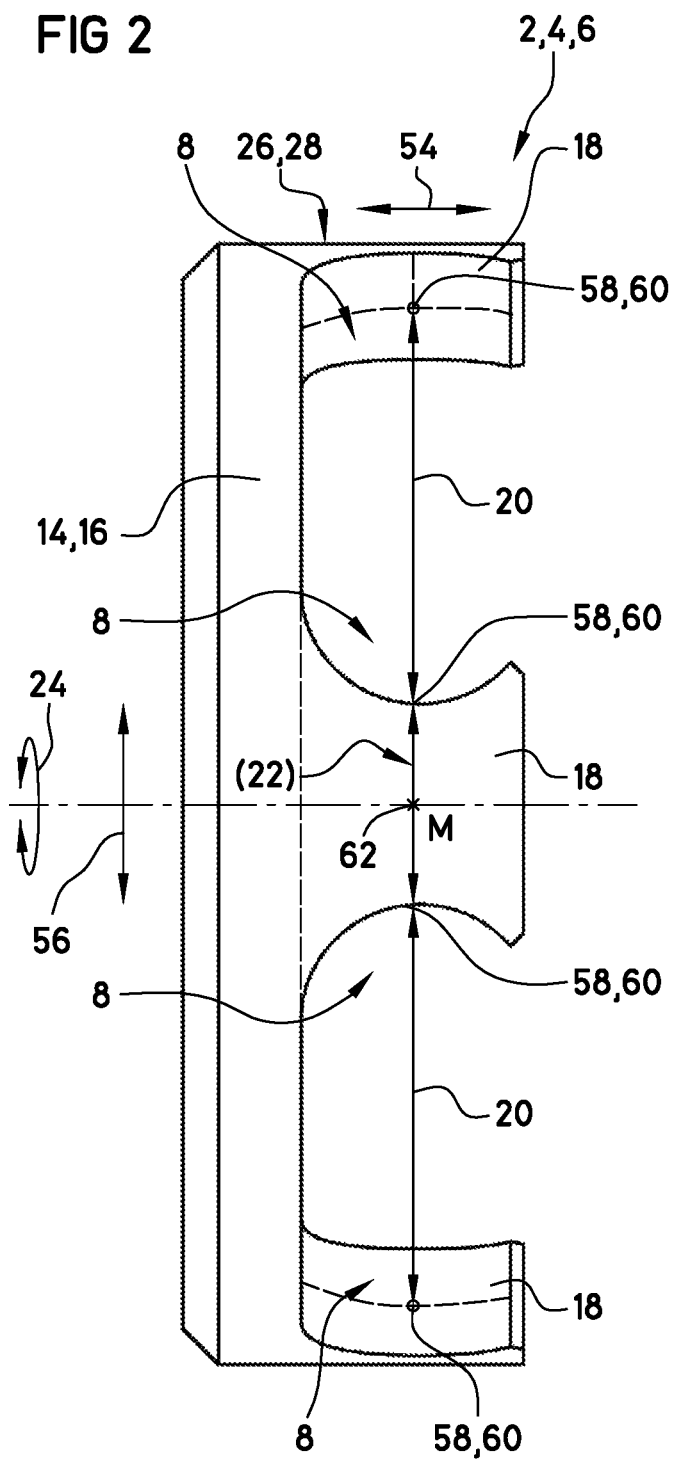
FIG. 2 shows the one cage half of the two-part snap cage with the two identical cage halves according to a first realization (side view)
Figure 3:
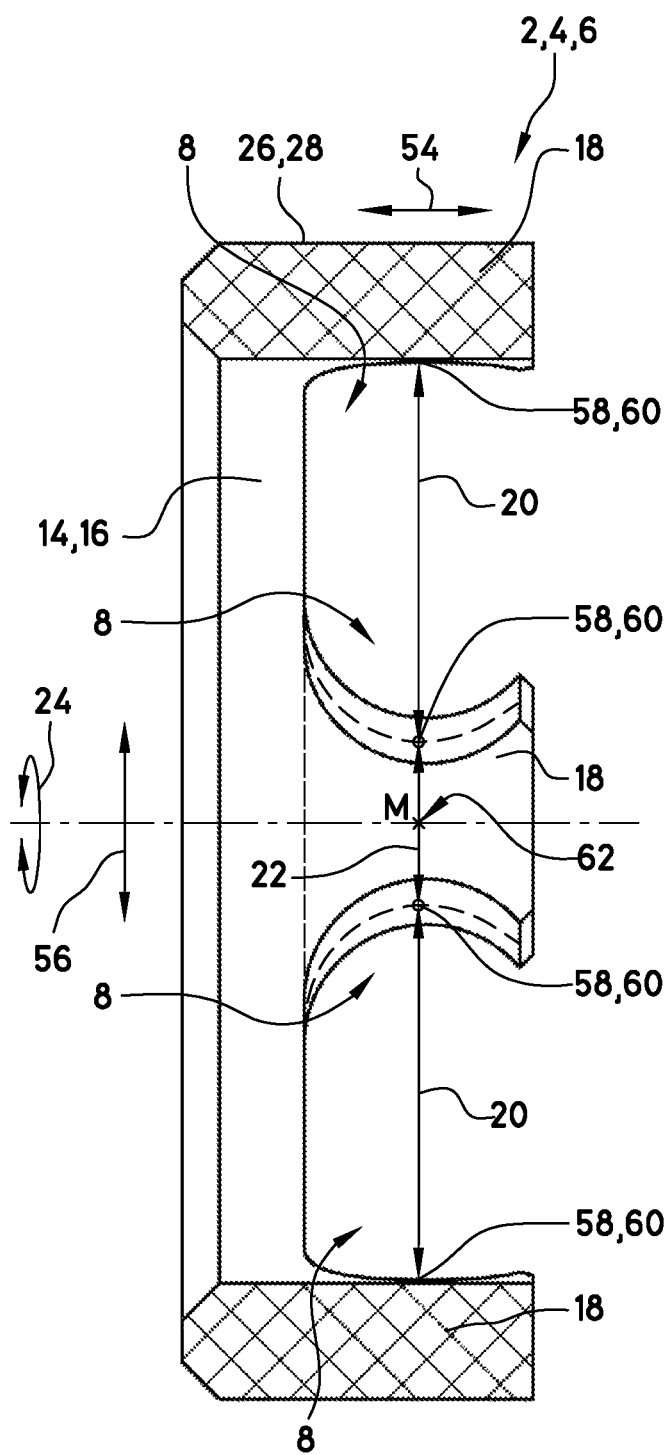
FIG. 3 shows the one cage half of the two-part snap cage with the two identical cage halves according to a first realization (section through the side view)

Two-Part Ball Bearing Cage or Snap Cage 2 (FIGS. 1 to 16)

FIGS. 1 to 8 show (in various views, in perspective, in side view and sectional representations, and also installed in a single-row radial deep groove ball bearing 40) a first realization of a two-part ball bearing cage or a two-part snap cage 2 ("two-part ball bearing cage or snap cage 2 with a cylindrical outer surface"); FIGS. 9 to 16 show (also in the corresponding, different views, in perspective, in side view and sectional representations, and once again installed in a single-row radial deep groove ball bearing 40) a second realization of the two-part ball bearing cage or a two-part snap cage 2 ("two-part ball bearing cage or snap cage 2 with a conical outer surface").

Said two-part ball bearing cages or two-part snap cages 2 realize—with their two (approximately) identical (cage) parts 4, 6, i.e. two identical cage halves 4, 6,—ball pockets 8 which serve for receiving balls 10 of a ball bearing 40 or—in this case—of a single-row radial deep groove ball bearing 40 (cf. FIGS. 7 and 8 or 15 and 16).

In this case, each configured ball pocket 8 of the two-part ball bearing cage or snap cage 2 receives one ball 10. All balls 10 accommodated in the configured ball pockets 8 of the two-part ball bearing cage or snap cage 2 are also designated as a whole as ball set 50 (of the ball bearing or single-row radial deep groove ball bearing 40).

The balls 10 of the ball set 50 used comprise a predefinable ball diameter 12, for example 1 mm, as a result of which—in this case—the corresponding ball bearing 40 (with said balls 10 or ball set 50) then falls within the range of a miniature application, for example a dental application, such as in the case of a dental turbine.

Two-Part Ball Bearing Cage or Snap Cage 2 with a Cylindrical Outer Surface 26, 28 (FIGS. 1 to 8)

FIGS. 1 to 5 each show a cage half 4, 6 of the two-part ball bearing cage 2 or two-part snap cage 2 (abbreviated below to only snap cage 2) according to the first realization ("cylindrical outer surface 26, 28"). Both cage halves 4, 6 of the snap cage 2 are configured identically to one another (cf. FIGS. 6 and 7).

As shown in FIGS. 1 to 5 in each case—as an example—for the one of the two (identical) cage halves 4, 6, each cage half 4, 6 comprises a ring-shaped cage back 14, 16 and—distributed approximately uniformly in a circumferential direction 24 of the snap cage 2 or the cage halves 4, 6—webs 18 which are arranged thereon projecting axially 54 (or in the width direction 54 of the snap cage 2 or of the cage half 4, 6).

The webs 18, as shown in FIGS. 1 to 3 and 6 to 7, which in their axial or width direction 54 comprise a biconcave progression/a biconcave form, the bulges/curvatures of which are each ("inwardly") adapted to the ball cross section ("circle/circular arc" of the balls 10, thus (together) realize the ball pockets 8 by delimiting a ball pocket 8 in the circumferential direction 24 of the snap cage 2 or of the cage half 4, 6.

The widths 64 of the configured ball pockets 8 (in the axial direction 54) are in each case slightly larger than the ball diameter 12 of the balls 10.

As FIGS. 1 to 7 also show, the cage part 4, 6 comprises a cylindrical outer surface 26, 28 in the axial direction 54. Said first realization or said cage design can preferably be used in such single-row radial deep groove ball bearings 40 where spherical lugs do not bend outward conditional on the speed as a result of centrifugal forces arising in the single-row radial deep groove ball bearings 40.

Deviating from or differently to in the case of a snap cage customary up to now or to a cage part in such a case having webs realizing ball pockets, here, i.e. in the case of the present snap cage half 2 or in the case of the present cage half 4, 6, as illustrated in particular in FIGS. 1 to 5,—the distance 20—in the circumferential direction 24 of the snap cage 2 or of the cage halves 4, 6—between in each case two of the webs 18 adjacent in the circumferential direction 24 corresponds to the sum of twice the ball diameter 12 of the balls 10 provided for the ball pockets 8 and a width 22 of the or of such a web 18 in the circumferential direction 24. Possible tolerances and/or a ball pocket play can be added or taken into consideration (to/in the sum).

As a result, i.e. in the case of such a distance 20 in the case of/between the webs 18 of the or in the case of the cage halves 4, 6, two ball pockets 8 can be realized and thus two balls 10 received—in the circumferential direction 24 of the snap cage 2 or of the cage halves 4, 6—between in each case the two webs 18 of the cage halves 4, 6 adjacent in the circumferential direction 24 (differing from the otherwise usual approach).

Said "distance" 20 between the two webs 18 adjacent in the circumferential direction 24 is dimensioned i.e. can be measured, as illustrated, in particular in FIGS. 1 to 5, at an axial 54, i.e. the extension of the/a ball pocket 8 in the axial direction 54 (also width direction 54) of the snap cage 2 or of the cage half 4, 6, center 58 of the/a ball pocket 8 and at a central radial 56, i.e. the extension of a web 18 radially 56 toward or away from a center point M 62 of the snap cage 2, height 60 of a web 18 or of the webs 18—and is the length 20 of the corresponding circular arc (circular arc length 20) realized in this respect between the two adjacent webs 18 (cf. in particular FIGS. 1 to 5).

The "width" 22 of the/a web 18 means the extension 22 thereof, put clearly a (circular arc) length 22, in the circumferential direction 24 of the snap cage 2 or of the cage halve 4, 6—here then at the axial center 58 of the/a ball pocket 8 and at the central radial height 60 of the/a web 18 or the webs 18 (cf. in particular FIGS. 1 to 5).

Put clearly and simply, in each case two webs 18 of the cage half 4, 6 adjacent in the circumferential direction 24 (arranged on the cage back 14, 16 of the respective cage half 4, 6) are spaced apart or removed from one another (by such an amount) in such a manner—in the circumferential direction 24—(according to the distance 20 provided), that two ball pockets 8 (for receiving two balls 10) can be realized between them (with the snap cage 2 mounted—cf. FIGS. 6 and 7), particularly when or particularly as a result of—when the two cage halves 4, 6 snap against one another into the ball set 50 (cf. FIG. 7) during or after mounting of the snap cage 2—one web 18 of the one cage part 4, 6 "enters" axially into or comes to rest (approximately centrally) between the two webs 18 of the other cage part 4, 6 adjacent in the circumferential direction 24.

Figure 6:
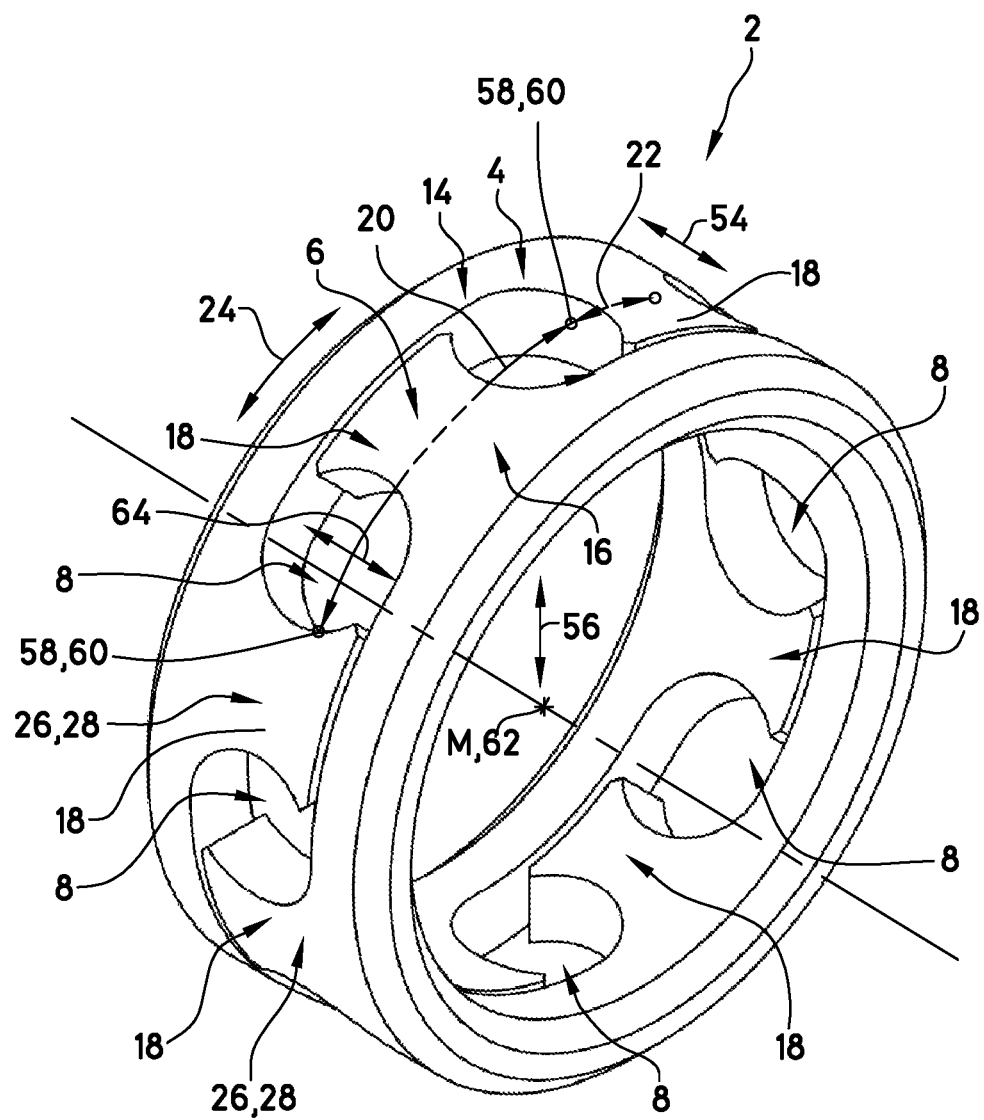
FIG. 6 shows both cage halves of the two-part snap cage with the two identical cage halves according to a first realization (in perspective)
Figure 7:
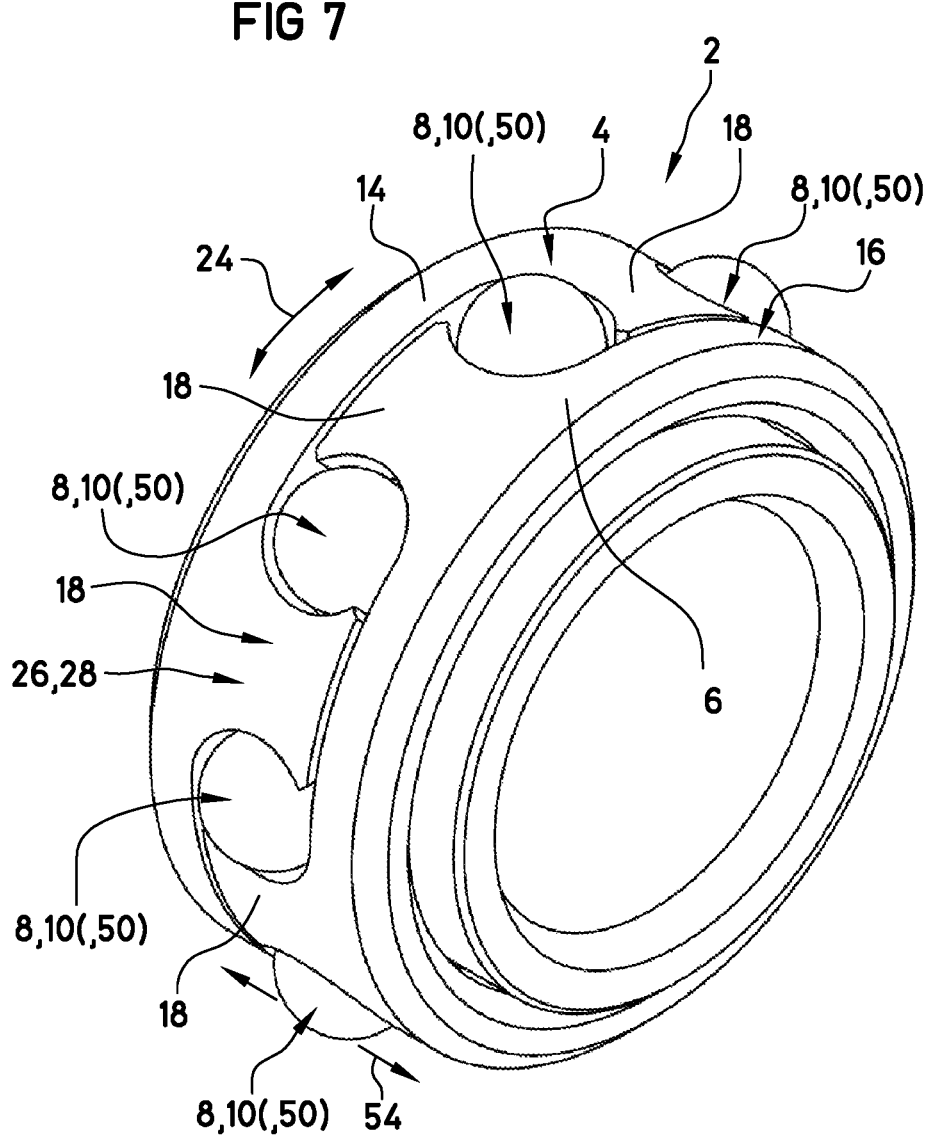
FIG. 7 shows both cage halves of the two-part snap cage with the two identical cage halves according to a first realization with inner ring and balls (in perspective)

Put another way, the webs 18 of the one cage part 4, 6 and the webs 18 of the other cage part 4, 6 delimit, as illustrated in FIGS. 6 and 7,—with the snap cage 2 in the mounted state—the individual ball pockets 8 in the snap cage 2 in a mutual or in each case an alternate manner.

The snap cage 2 thus provides the two identical cage halves 4, 6, the two cage halves 4, 6 of which—with the snap cage 2 mounted—can snap against one another into the ball cage set 50 of the ball bearing 40 ("(snap" lock/"snap locking"), the—even number of—ball pockets 8 of the snap cage 2—once the snap cage 2 or the cage halves 4, 6 have been mounted in the ball bearing 40—being configured in this manner.

Figure 4:
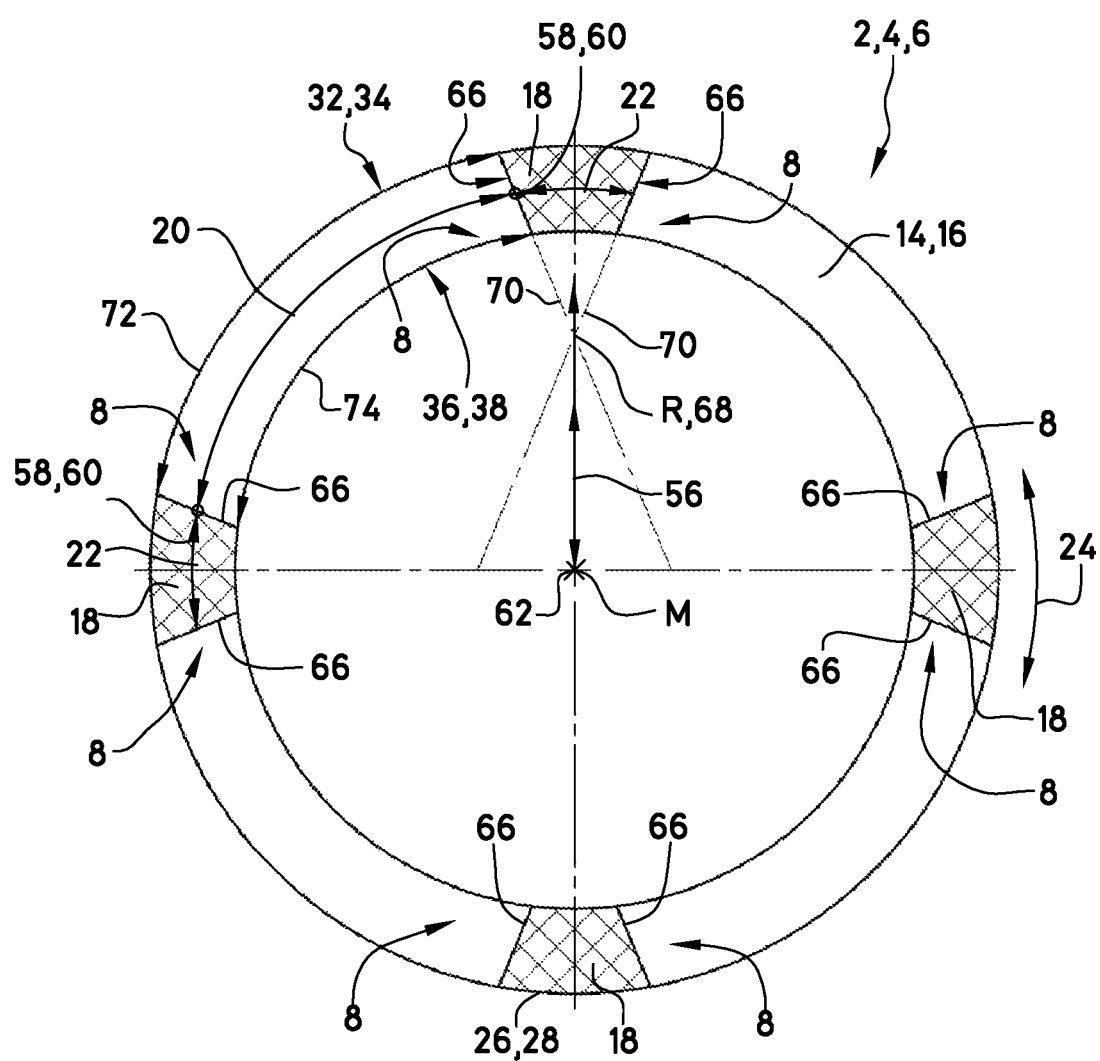
FIG. 4 shows the one cage half of the two-part snap cage with the two identical cage halves according to a first realization (section through the front view)
Figure 5:
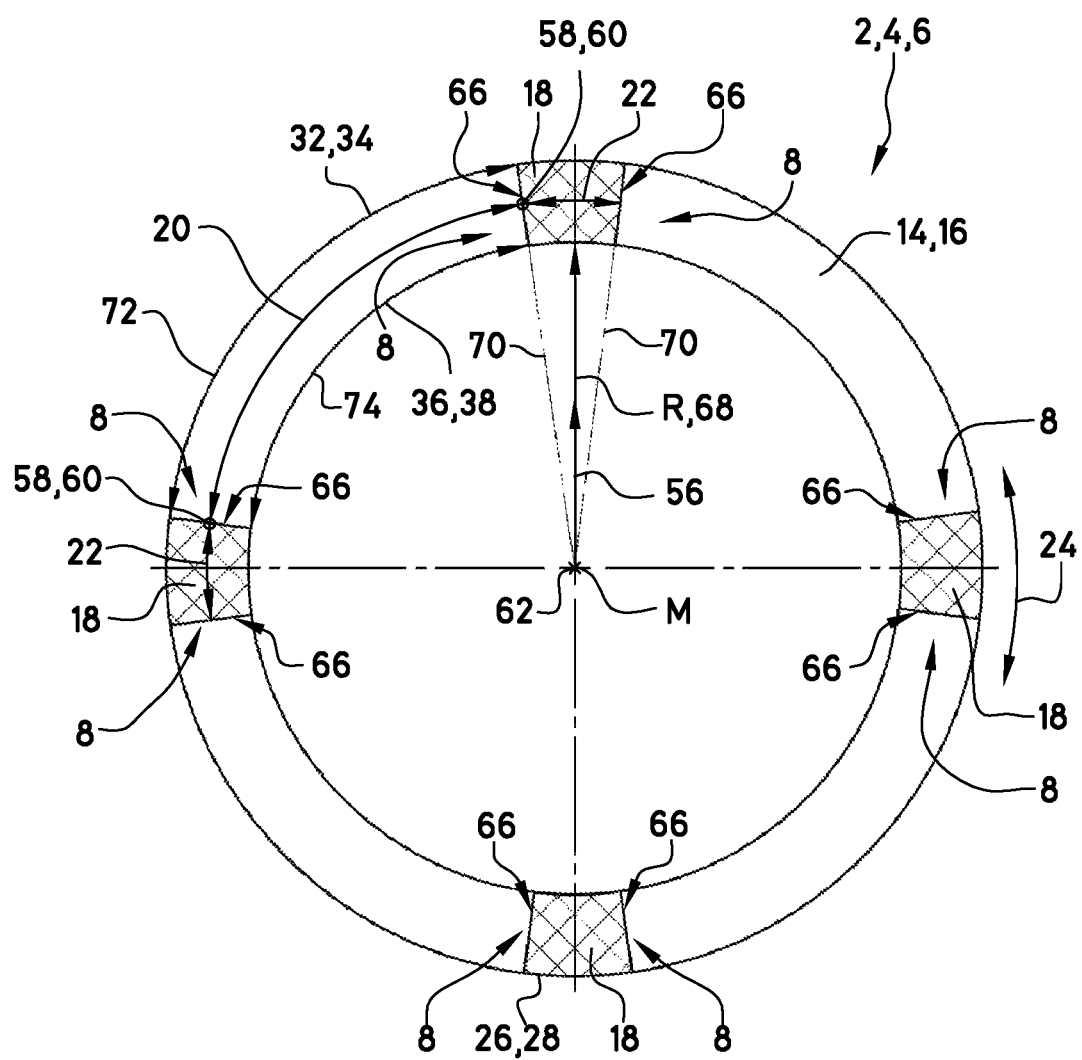
FIG. 5 shows the one cage half of the two-part snap cage with the two identical cage halves according to an alternative first realization (section through the front view, "funnel shape")

FIGS. 4 and 5 show two possible alternative (sub) design forms of the first realization of the snap cage 2, i.e. in the case of the snap cage 2 with the cylindrical outer surface 26, 28.

As shown in FIG. 4—as an example for the one cage half 4,6 of the two identical cage halves 4, 6 of the snap cage 2, said first (sub) design form provides that a distance 72 between the in each case two webs 18 adjacent in the circumferential direction is approximately the same size in the circumferential direction 24 on an outer circumference 32, 34 of the cage half 4, 6 as a distance 74 between the two webs 18 on an inner circumference 36, 38 of the cage half 4, 6, i.e. the distance 20 also corresponds approximately to the sum of twice the ball diameter 12 of the balls 10 provided for the ball pockets 8 and one width 22 of the or such a web 18 in the circumferential direction 24.

As FIG. 4—said dimensioning—illustrates (in section) (FIG. 4 is a (cross) section of the snap cage 2 parallel to the radius R 68 of the snap cage 2 in the axial center 58 of the ball pocket 8), the walls 66 of the/a web 18, which delimit the ball pockets 8 in the circumferential direction 24, extend in the direction of the center point M 62 of the snap cage 2 in a converging manner to the extent that the (imaginary) elongations 70 thereof in the radial direction of the snap cage 2 intersect "in front of" the center point M 62 thereof.

In contrast, it is provided in the case of the second alternative (sub)design form, as shown in FIG. 5—once again as an example for the one cage half 4,6 of the two identical cage halves 4, 6 of the snap cage 2—that the distance 72 between the in each case two webs 18 adjacent in the circumferential direction 24 is—in this case—greater in the circumferential direction 24 on the outer circumference 32, 34 of the cage half 4, 6 than the distance 74 between the two webs 18 on an inner circumference 36, 38 of the cage part 4, 6, (notwithstanding and without prejudice to the provided distance 20 corresponding approximately to the sum of twice the ball diameter 12 of the balls 10 provided for the ball pockets 8 and the width 22 of the or such a web 18 in the circumferential direction 24—at the axial center 58 of the/a ball pocket 8 and at the mean radial height 60 of a web 18 or the webs 18).

As FIG. 5—said dimensioning—illustrates (also in section) (FIG. 5 is also a (cross) section of the snap cage 2 parallel to the radius R 68 of the snap cage 2 in the axial center 58 of the ball pocket 8), the walls 66 of the/a web 18, which delimit the ball pockets 8 in the circumferential direction 24, extend in the direction of the center point M 62 of the snap cage 2 in a converging manner to the extent that the (imaginary) elongations 70 thereof in the radial direction of the snap cage 2 intersect in the center point M 62 thereof.

Said different distance dimensioning (in the case of the second alternative (sub)design form) at the inner 32, 34 or outer circumference 36, 38 then results in particular—with the snap cage 2 mounted—in the configured ball pockets 8 (with the snap cage 2 mounted) each having different ball pocket lengths (in the circumferential direction 24) at the outer circumference 32, 34 or inner circumference 36, 38 of the snap cage 2 (ball pocket 8 with "funnel shape").

The snap cage 2 is produced from a high-grade plastics material such as, for example, polyether ether ketone (PEEK), polyether ketone (PEK), polyphenylene sulfide (PPS), polyamideimide (PAI) or Polyimide (PI).

Figure 8:
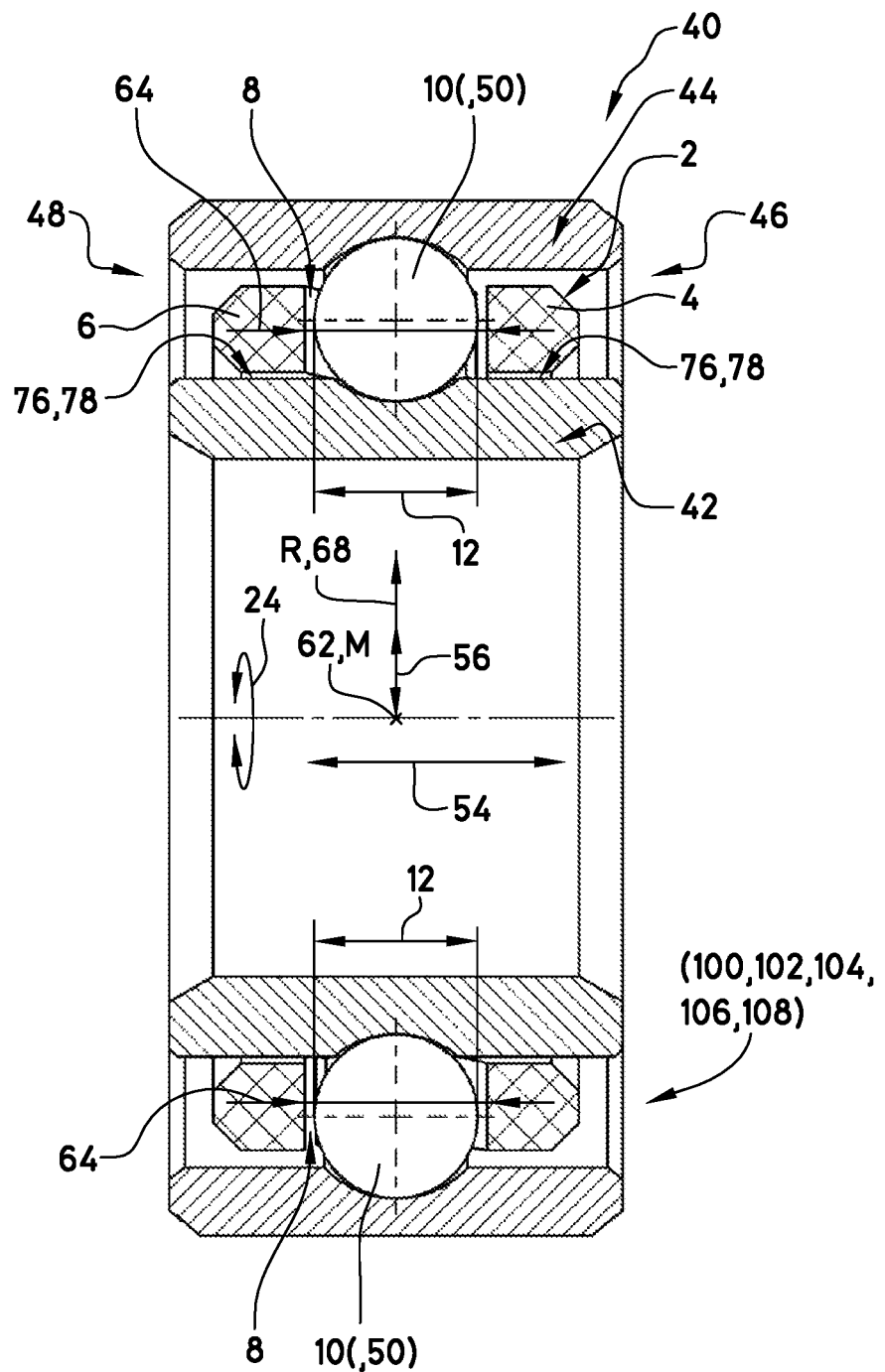
FIG. 8 shows radial deep groove ball bearings with an inner-ring-guided two-part snap cage with the two identical cage halves according to the first realization (section through the side view)
Figure 9:
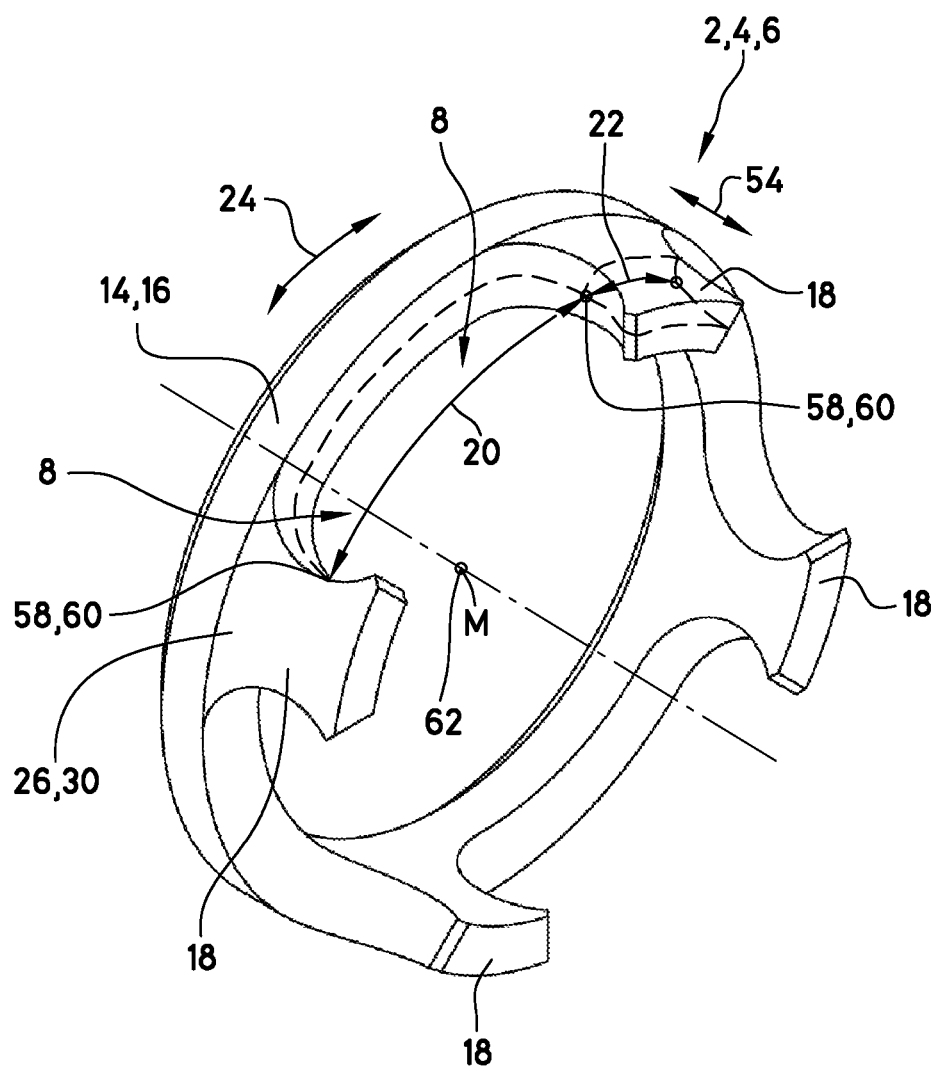
FIG. 9 shows the one cage half of a two-part snap cage with the two identical cage halves according to a second realization (in perspective)

FIG. 8 shows the single-row radial deep groove ball bearing 40 with the snap cage 2 installed holding the balls 10 in position—between an inner raceway 42 and an outer raceway 44.

The snap cage 2 is realized as an inner-ring-guided ball bearing cage 2, i.e. the inner circumference 36, 38 of the snap cage 2 or the inner circumferences 36, 38 of the two cage halves 4, 6 slides/slide along an outer circumference 76 of the inner raceway 42.

As a result of the fact that, in this case, each cage half 4, 6 of the snap cage 2 can be guided separately on an inner ring shoulder 78 of the inner raceway 42 in the case of the single-row radial deep groove ball bearing 40, vibrations that arise can be damped in an advantageous manner.

The outer raceway 44 and the inner raceway 42 of the single-row radial deep groove ball bearing 40 are produced from chromium steel, such as, for example, from 100Cr6 (material number 1.3505), a steel with a content of approximately 1% carbon and 1.5% chromium.

Method steps 100, 102, 104, 106 and 108 are described below and shown in parentheses in FIGS. 8 and 16 to indicate where the steps are carried out on the ball bearing cage.

During the mounting 100 of the single-row radial deep groove ball bearings 40, first of all the balls 10 are moved 102 abutting against one another into the outer raceway 44.

The inner raceway 42 is then first of all added into the outer raceway 44 from of an eccentric position and then moved 104 into an approximately concentric position in the outer raceway 44.

In addition, the balls 10 are then distributed such that they are at approximately identical distances 106 from one another in the circumferential direction 24.

After this, the two cage parts 4, 6 are inserted one after the other between the inner and the outer raceway 42, 44 from both sides 46, 48, snapping 108 against one another into the ball set 50.

Two-Part Ball Bearing Cage or Snap Cage 2 with a Conical Outer Surface 26, 30 (FIGS. 9 to 16)

FIGS. 9 to 13 each show a cage half 4, 6 of the two-part ball bearing cage 2 or two-part snap cage 2 (abbreviated below again to only snap cage 2) according to the second realization ("conical outer surface 26, 30"). Both cage halves 4, 6 of the snap cage 2 (corresponding to the or as also in the case of the snap cage 2 according to the first realization) are configured identically to one another (cf. FIGS. 14 and 15).

As shown in FIGS. 9 to 13 in each case—as an example—for the one of the two (identical) cage halves 4, 6, each cage half 4, 6 (corresponding to the or as also in the case of the snap cage 2 according to the first realization) comprises a ring-shaped cage back 14, 16 and—distributed approximately uniformly in a circumferential direction 24 of the snap cage 2 or the cage halve 4, 6—webs 18 which are arranged thereon projecting axially 54 (or in the width direction 54 of the snap cage 2 or of the cage half 4, 6).

The webs 18, as shown in FIGS. 9 to 11 and 14 to 15, which, (corresponding to the or as also in the case of the snap cage 2 according to the first realization), in their axial or width direction 54 comprise a biconcave progression/a biconcave form, the bulges/curvatures of which are each ("inwardly") adapted to the ball cross section ("circle/circular arc" of the balls 10, thus (corresponding to the or as also in the case of the snap cage 2 according to the first realization) realize (together) the ball pockets 8 by delimiting a ball pocket 8 in the circumferential direction 24 of the snap cage 2 or of the cage half 4, 6.

The widths 64 of the configured ball pockets 8 (in the axial direction 54) are (corresponding to the or as also in the case of the snap cage 2 according to the first realization) in each case slightly larger than the ball diameter 12 of the balls 10.

As FIGS. 9 to 15 also show, the cage part 4, 6 comprises (deviating from the snap cage 2 according the first realization) a conical outer surface 26, 30 in the axial direction 54. Said second realization or said cage design can preferably be used in such single-row radial deep groove ball bearings 40 where spherical lugs bend outward conditional on the speed as a result of centrifugal forces arising in the single-row radial deep groove ball bearings 40, as a result of which the then outwardly bent spherical lugs can be prevented from contacting a shoulder or a running track of an outer raceway of the single-row radial deep groove ball bearing 40.

Figure 10:
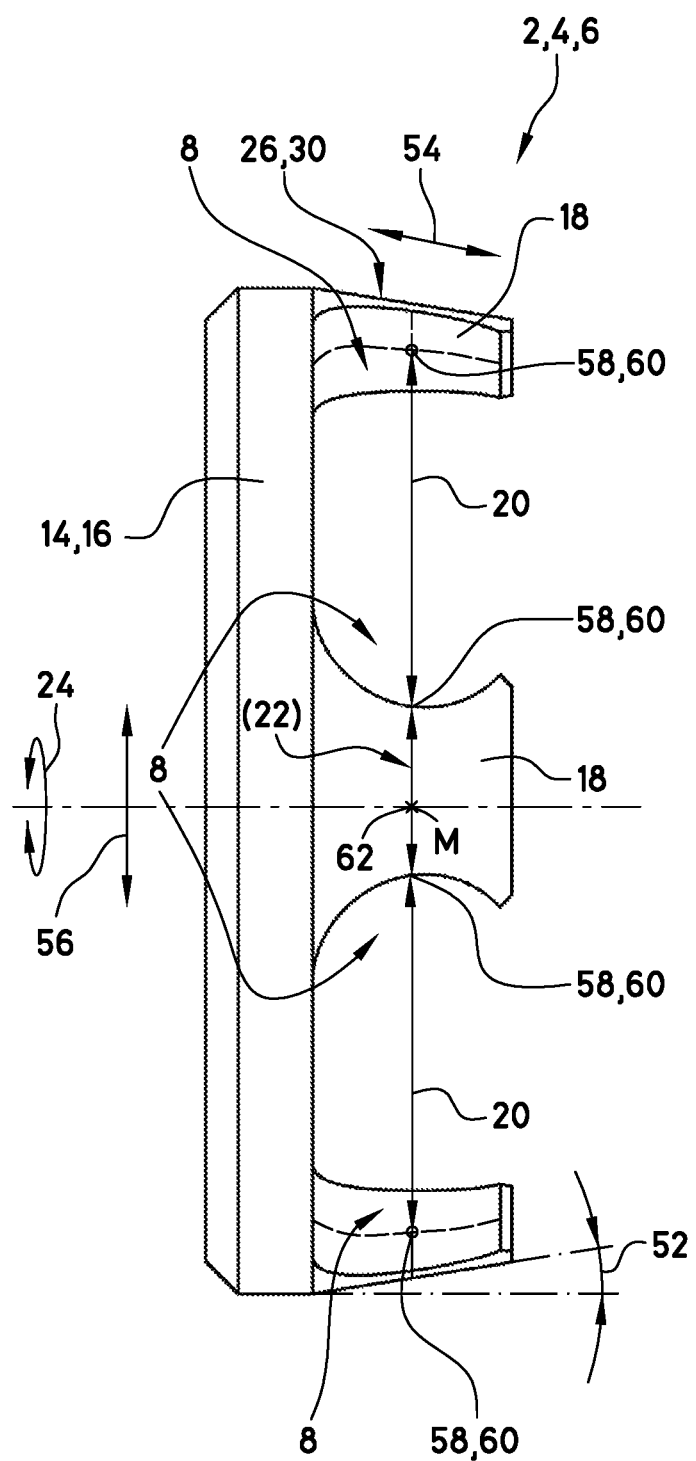
FIG. 10 shows the one cage half of the two-part snap cage with the two identical cage halves according to the second realization (side view)
Figure 11:
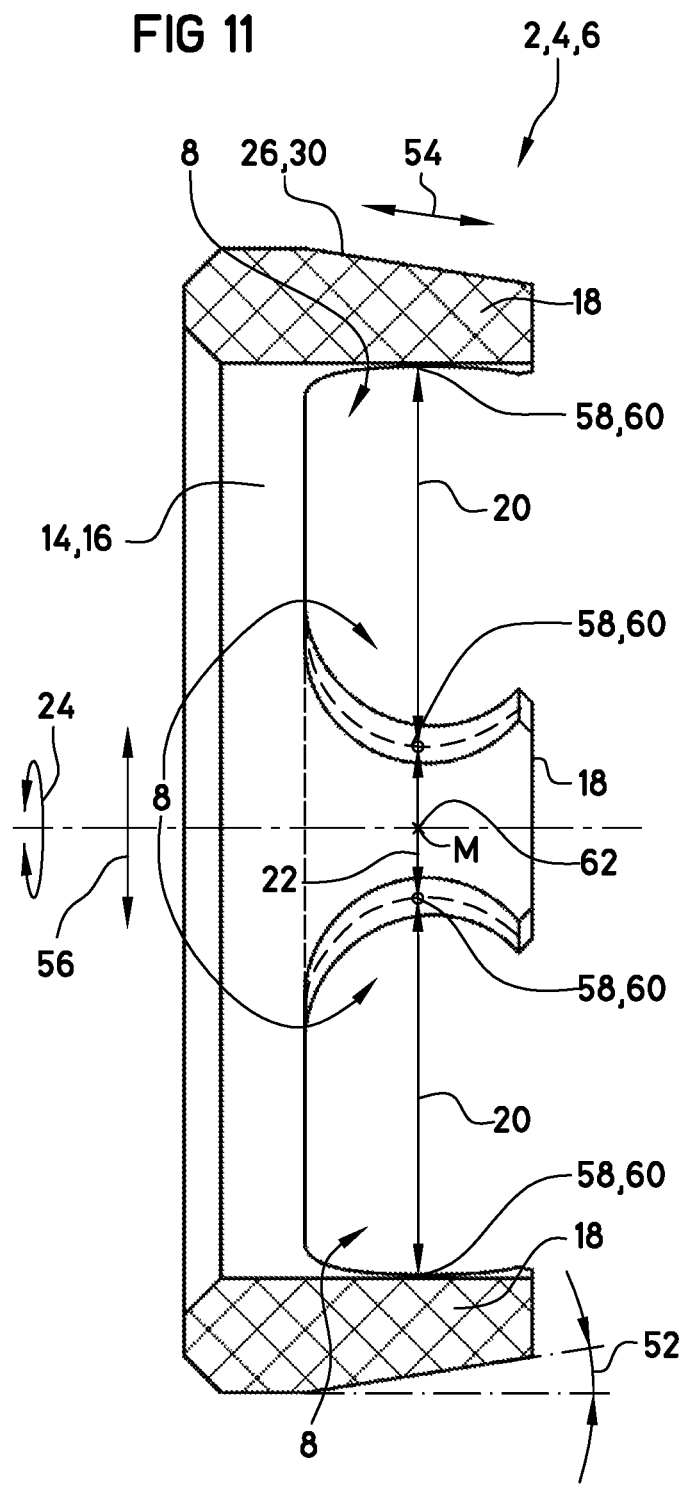
FIG. 11 shows the one cage half of the two-part snap cage with the two identical cage halves according to the second realization (section through the side view)

The cone angle 52 of said conical outer surface 26, 30 in the case of the cage part 4, 6 of the snap cage 2 is, as also illustrated in FIGS. 9 to 15, in particular FIGS. 10 and 11, in this case approximately 10°.

Deviating from or differently to in the case of a snap cage customary up to now or to a cage part in such a case having webs realizing ball pockets, here, i.e. in the case of the present snap cage half 2 or in the case of the present cage half 4, 6, as illustrated in particular in FIGS. 9 to 13, (corresponding to the or as also in the case of the snap cage 2 according to the first realization)—the distance 20—in the circumferential direction 24 of the snap cage 2 or of the cage halve 4, 6—between in each case two of the webs 18 adjacent in the circumferential direction 24 corresponds to the sum of twice the ball diameter 12 of the balls 10 provided for the ball pockets 8 and a width 22 of the or of such a web 18 in the circumferential direction 24. Possible tolerances and/or a ball pocket play can be added or taken into consideration (to/in the sum).

As a result, i.e. in the case of such a distance 20 in the case of/between the webs 18 of the or in the case of the cage halve 4, 6, two ball pockets 8 can be realized and thus two balls 10 received—in the circumferential direction 24 of the snap cage 2 or of the cage halve 4, 6—between in each case the two webs 18 of the cage halves 4, 6 adjacent in the circumferential direction 24 (differently to as otherwise customary and corresponding to the or as also in the case of the snap cage 2 according to the first realization).

Said "distance" 20 between the two webs 18 adjacent in the circumferential direction 24 is dimensioned (corresponding to the or as also in the case of the snap cage 2 according to the first realization), i.e. can be measured, as illustrated, in particular in FIGS. 9 to 13, at an axial 54, i.e. the extension of the/a ball pocket 8 in the axial direction 54 (also width direction 54) of the snap cage 2 or of the cage half 4, 6, center 58 of the/a ball pocket 8 and at a mean radial 56, i.e. the extension of a web 18 radially 56 toward or away from a center point M 62 of the snap cage 2, height 60 of a web 18 or of the webs 18—and is the length 20 of the corresponding circular arc (circular arc length 20) realized in this respect between the two adjacent webs 18 (cf. in particular FIGS. 9 to 13).

The "width" 22 of the/a web 18 means (corresponding to the or as also in the case of the snap cage 2 according to the first realization) the extension 22 thereof, put clearly a (circular arc) length 22, in the circumferential direction 24 of the snap cage 2 or of the cage halve 4, 6—here then at the axial center 58 of the/a ball pocket 8 and at the mean radial height 60 of the/a web 18 or the webs 18 (cf. in particular FIGS. 9 to 13).

Put clearly and simply, in each case two webs 18 of the cage half 4, 6 adjacent in the circumferential direction 24 (arranged on the cage back 14, 16 of the respective cage half 4, 6) are spaced apart or removed from one another (by such an amount) in such a manner—in the circumferential direction 24—(according to the distance 20 provided), that two ball pockets 8 (for receiving two balls 10) can be realized between them (with the snap cage 2 mounted—cf. FIGS. 14 and 15), particularly when or particularly as a result of— when the two cage halves 4, 6 snap against one another into the ball set 50 (cf. FIG. 15) during or after mounting of the snap cage 2—one web 18 of the one cage part 4, 6 "enters" axially into or comes to rest (approximately centrally) between the two webs 18 of the other cage part 4, 6 adjacent in the circumferential direction 24.

Figure 14:
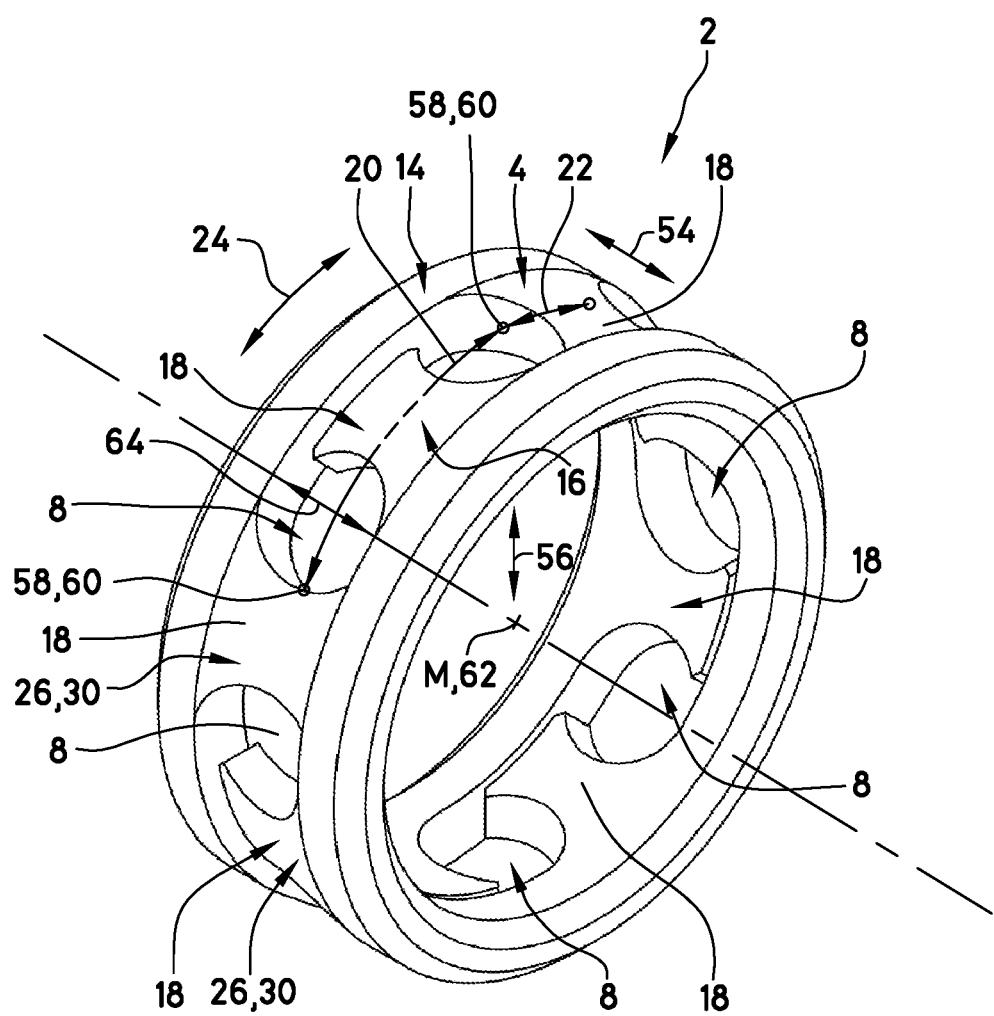
FIG. 14 shows both cage halves of the two-part snap cage with the two identical cage halves according to the second realization (in perspective)
Figure 15:
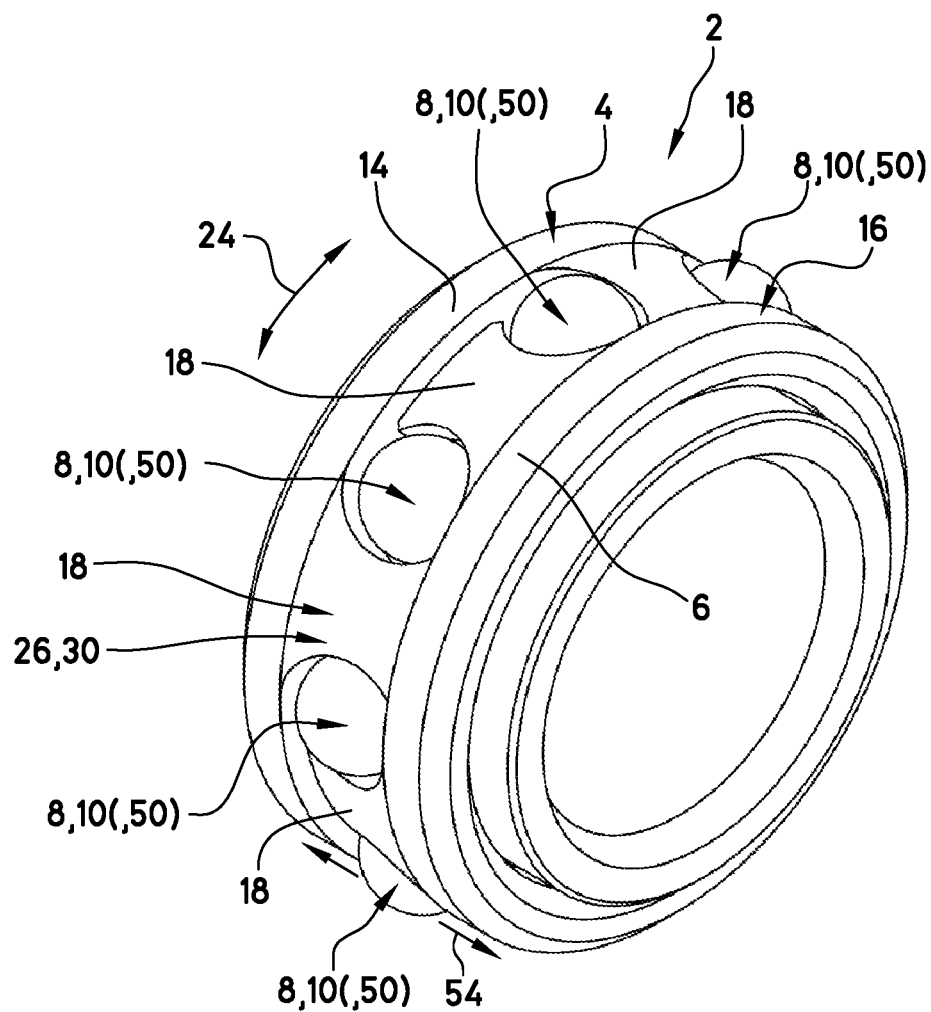
FIG. 15 shows both cage halves of the two-part snap cage with the two identical cage halves according to the second realization with inner ring and balls (in perspective)

Put another way, the webs 18 of the one cage part 4, 6 and the webs 18 of the other cage part 4, 6 delimit, (corresponding to the or as also in the case of the snap cage 2 according to the first realization) as illustrated in FIGS. 14 and 15,— with the snap cage 2 in the mounted state—the individual ball pockets 8 in the snap cage 2 in a mutual or in each case alternating manner.

The snap cage 2 thus provides (corresponding to the or as also in the case of the snap cage 2 according to the first realization) the two identical cage halves 4, 6, the two cage halves 4, 6 of which—with the snap cage 2 mounted—can snap against one another into the ball set 50 of the ball bearing 40 ("(snap" lock/"snap locking"), the—even number of—ball pockets 8 of the snap cage 2—once the snap cage 2 or the cage halves 4, 6 have been mounted in the ball bearing 40—being configured in this manner.

Figure 12:
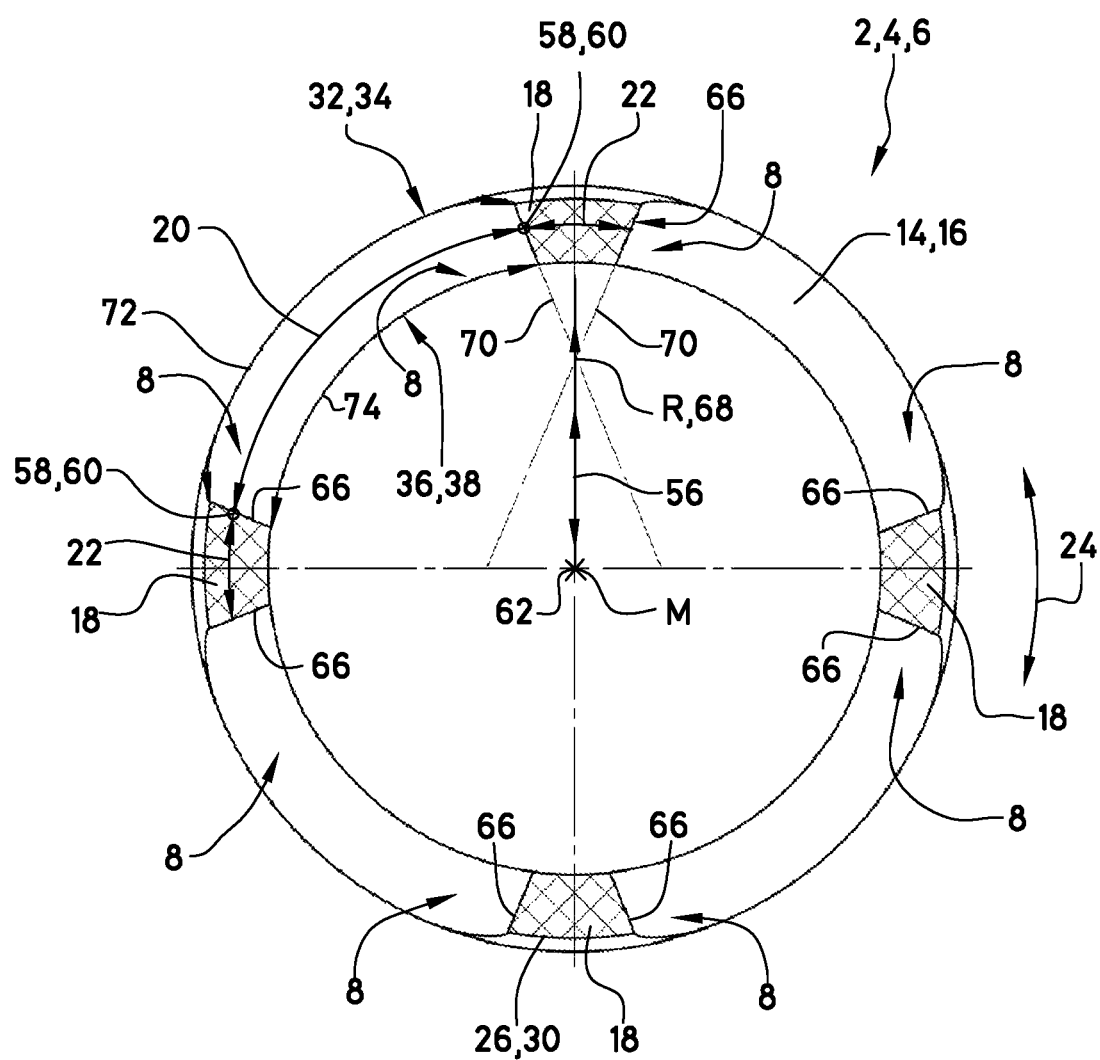
FIG. 12 shows the one cage half of the two-part snap cage with the two identical cage halves according to the second realization (section through the front view)
Figure 13:
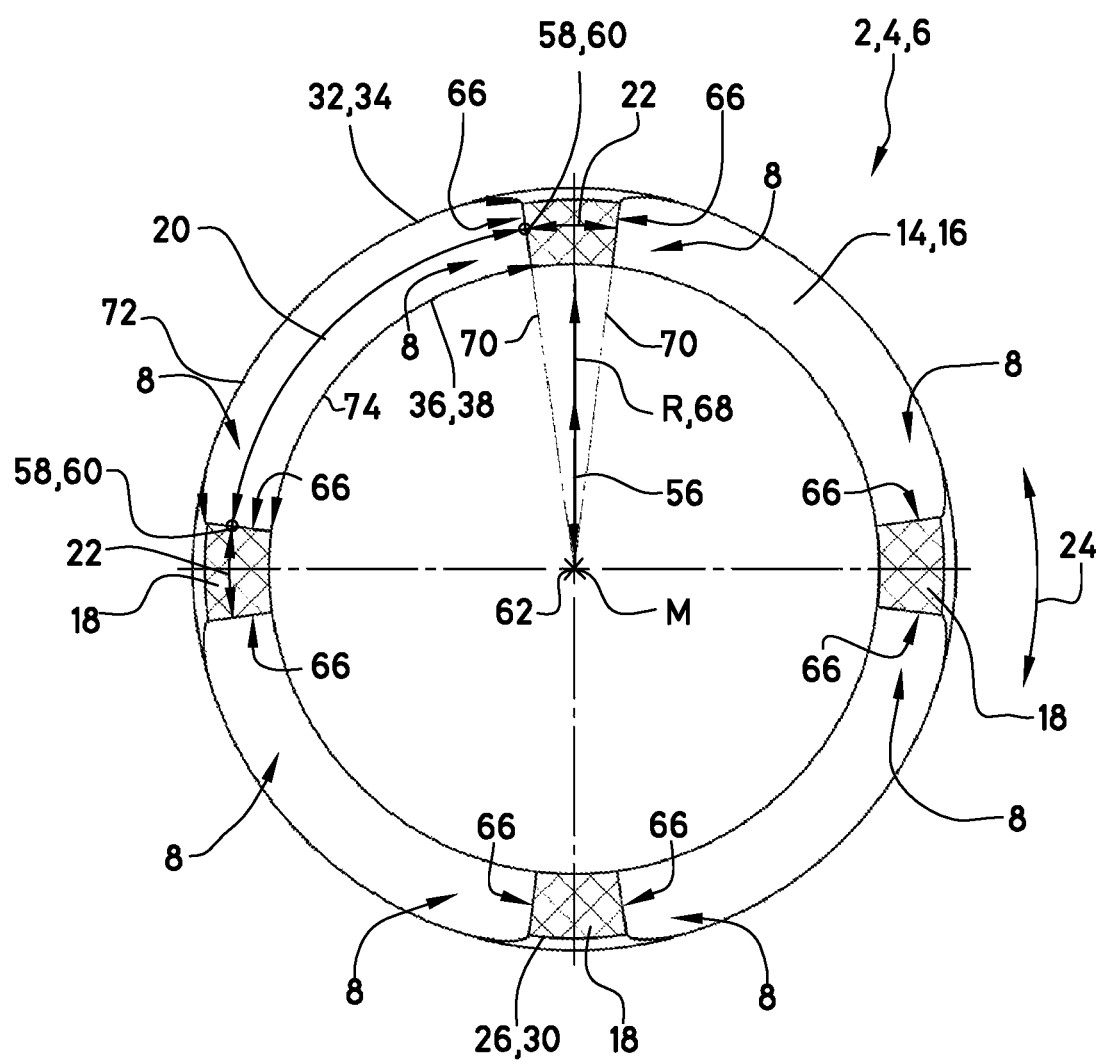
FIG. 13 shows the one cage half of the two-part snap cage with the two identical cage halves according to an alternative second realization (section through the front view, "funnel shape")

FIGS. 12 and 13 show (corresponding to the or as also in the case of the snap cage 2 according to the first realization) two possible alternative (sub)design forms of the second realization of the snap cage 2, i.e. in the case of the snap cage 2 with the conical outer surface 26, 30.

As shown in FIG. 12—as an example for the one cage half 4,6 of the two identical cage halves 4, 6 of the snap cage 2, said first (sub)design form provides (corresponding to the or as also in the case of the snap cage 2 according to the first realization) that a distance 72 between the in each case two webs 18 adjacent in the circumferential direction is approximately the same size in the circumferential direction 24 on an outer circumference 32, 34 of the cage half 4, 6 as a distance 74 between the two webs 18 on an inner circumference 36, 38 of the cage part 4, 6, i.e. the distance 20 also corresponds approximately to the sum of twice the ball diameter 12 of the balls 10 provided for the ball pockets 8 and one width 22 of the or such a web 18 in the circumferential direction 24.

As FIG. 12—said dimensioning—illustrates (also in section) (FIG. 12 is a (cross) section of the snap cage 2 parallel to the radius R 68 of the snap cage 2 in the axial center 58 of the ball pocket 8), the walls 66 of the/a web 18, which delimit the ball pockets 8 in the circumferential direction 24, extend in the direction of the center point M 62 of the snap cage 2 in a converging manner to the extent that the (imaginary) elongations 70 thereof in the radial direction of the snap cage 2 intersect "in front of" the center point M 62 thereof.

In contrast, it is provided in the case of the second alternative (sub)design form, as shown in FIG. 13—once again as an example for the one cage half 4,6 of the two identical cage halves 4, 6 of the snap cage 2—that (corresponding to the or as also in the case of the snap cage 2 according to the first realization) the distance 72 between the in each case two webs 18 adjacent in the circumferential direction 24 is—in this case—greater in the circumferential direction 24 on the outer circumference 32, 34 of the cage half 4, 6 then the distance 74 between the two webs 18 on the inner circumference 36, 38 of the cage part 4, 6, (notwithstanding and without prejudice to the provided distance 20 corresponding approximately to the sum of twice the ball diameter 12 of the balls 10 provided for the ball pockets 8 and the width 22 of the or such a web 18 in the circumferential direction 24—at the axial center 58 of the/a ball pocket 8 and at the mean radial height 60 of a web 18 or the webs 18).

As FIG. 13—said dimensioning—illustrates (also in section) (FIG. 13 is also a (cross) section of the snap cage 2 parallel to the radius R 68 of the snap cage 2 in the axial center 58 of the ball pocket 8), the walls 66 of the/a web 18, which delimit the ball pockets 8 in the circumferential direction 24, extend in the direction of the center point M 62 of the snap cage 2 in a converging manner to the extent that the (imaginary) extensions 70 thereof in the radial direction of the snap cage 2 intersect in the center point M 62 thereof.

Said different distance dimensioning (in the case of the second alternative (sub)design form) at the outer 32, 34 or inner circumference 36, 38 then results—with the snap cage 2 mounted—in particular (corresponding to the or as also in the case of the snap cage 2 according to the first realization) in the configured ball pockets 8 (with the snap cage 2 mounted) each having different ball pocket lengths (in the circumferential direction 24) at the outer circumference 32, 34 or inner circumference 36, 38 of the snap cage 2 (ball pocket 8 with "funnel shape").

The snap cage 2 (corresponding to the or as also in the case of the snap cage 2 according to the first realization) is produced from a high-grade plastics material such as, for example, polyether ether ketone (PEEK), polyether ketone (PEK), polyphenylene sulfide (PPS), polyamideimide (PAI) or Polyimide (PI).

Figure 16:
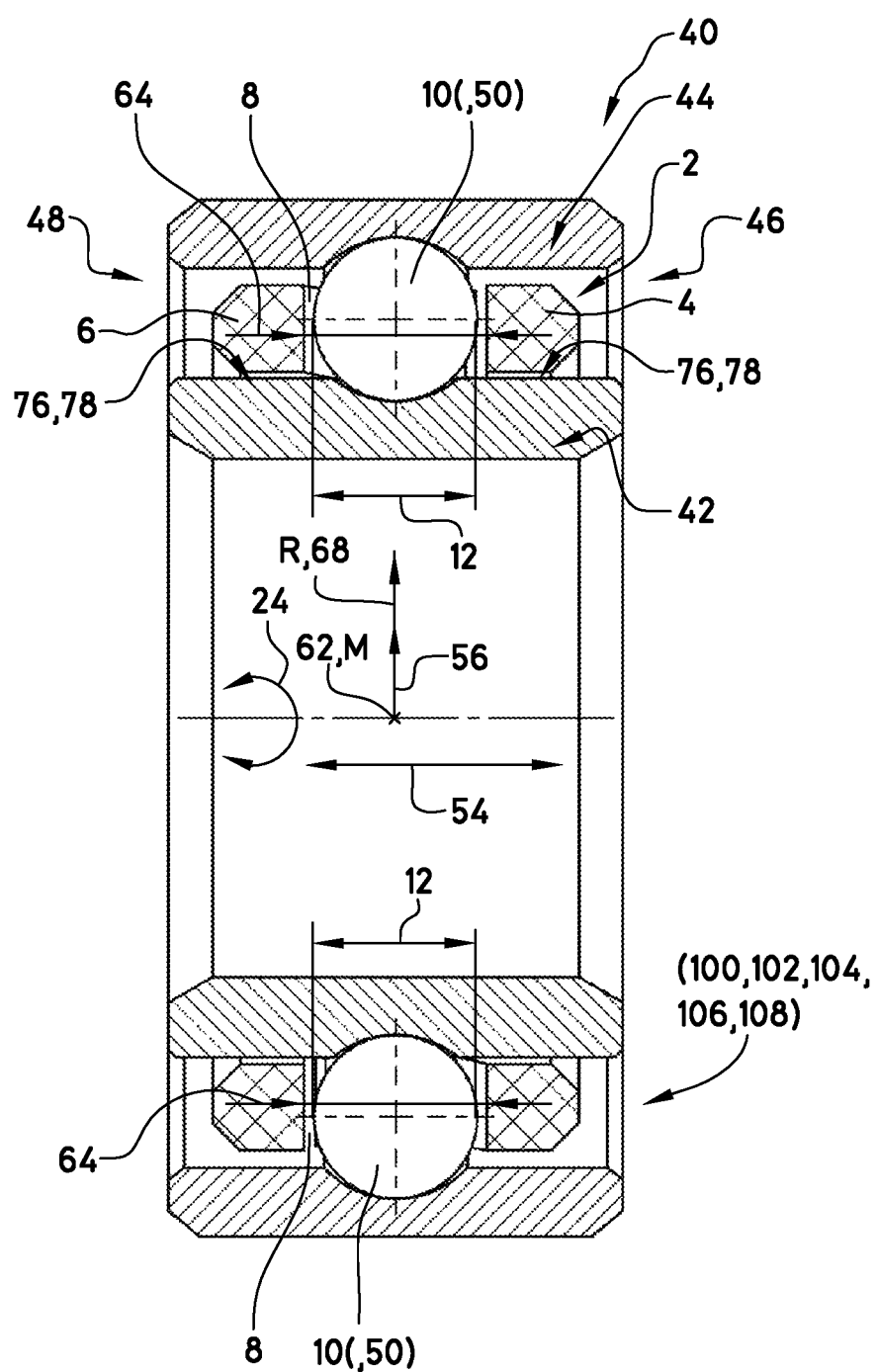
FIG. 16 shows radial deep groove ball bearings with an inner-ring-guided two-part snap cage with the two identical cage halves according to the second realization (section through the side view).

FIG. 16 (corresponding to the or as also in the case of the snap cage 2 according to the first realization) shows the single-row radial deep groove ball bearing 40 with the snap cage 2 installed holding the balls 10 in position—between an inner raceway 42 and an outer raceway 44. The snap cage 2 (corresponding to the or as also in the case of the snap cage 2 according to the first realization) is realized as an inner-ring-guided ball bearing cage 2, i.e. the inner circumference 36, 38 of the snap cage 2 or the inner circumferences 36, 38 of the two cage halves 4, 6 slides/slide along an outer circumference 76 of the inner raceway 42.

As a result of the fact that, in this case, (corresponding to the or as also in the case of the snap cage 2 according to the first realization) each cage half 4, 6 of the snap cage 2 can be guided separately on an inner ring shoulder 78 of the inner raceway 42 in the case of the single-row radial deep groove ball bearing 40, vibrations that arise can be damped in an advantageous manner.

The outer raceway 44 and the inner raceway 42 of the single-row radial deep groove ball bearing 40 are produced (corresponding to the or as also in the case of the snap cage 2 according to the first realization) from chromium steel, such as for example from 100Cr6 (material number 1.3505), a steel with a content of approximately 1% carbon and 1.5% chromium.

During the mounting 100 of the single-row radial deep groove ball bearings 40, (corresponding to the or as also in the case of the snap cage 2 according to the first realization), first of all the balls 10 are moved 102 abutting against one another into the outer raceway 44.

The inner raceway 42 is then first of all added into the outer raceway 44 from an eccentric position and then moved 104 into an approximately concentric position in the outer raceway 44. In addition, the balls 10 are then distributed such that they are at approximately identical distances 106 from one another in the circumferential direction 24.

After this, the two cage parts 4, 6 are inserted one after the other between the inner and the outer raceway 42, 44 from both sides 46, 48, snapping 108 against one another into the ball set 50.

Although the detail of the invention has been illustrated and described more closely by the preferred exemplary embodiment or embodiments, the invention is not limited by the disclosed examples and other variations can be deduced therefrom by the expert without departing from the scope of protection of the invention.

LIST OF REFERENCES 2 (Two-part) ball bearing cage, (two-part) snap cage
4 (First) cage part, (first) cage half
6 (Second) cage part, (second) cage half
8 Ball pocket
10 Ball
12 Ball diameter
14 Ring-shaped body/cage back of the first cage part/cage half 4
16 Ring-shaped body/cage back of the second cage part/cage half 6
18 Web
20 Distance, circular arc length (between two adjacent webs 18 of a cage half/cage part 4, 6)
22 Width of a web 18, extension of a web 18 along a circular arc (circular arc length) in the circumferential direction 24
24 Circumferential direction of the (two-part) ball bearing cage 2 or of the (two-part) snap cage 2 or of the cage half 4, 6 or of the ball bearing 40
26 Outer surface
28 Cylindrical outer surface
30 Conical outer surface
32 Outer circumference of the first cage part/cage half 4 or of the (two-part) ball bearing cage 2 or of the (two-part) snap cage 2 or of the ball bearing 40
34 Outer circumference of the second cage part/cage half 6 or of the (two-part) ball bearing cage 2 or of the (two-part) snap cage 2 or of the ball bearing 40
36 Inner circumference of the first cage part/cage half 4 or of the (two-part) ball bearing cage 2 or of the (two-part) snap cage 2 or of the ball bearing 40
38 Inner circumference of the second cage part/cage half 6 or of the (two-part) ball bearing cage 2 or of the (two-part) snap cage 2 or of the ball bearing 40
40 Ball bearing, (single-row) radial deep groove ball bearing
42 Inner raceway
44 Outer raceway
46 First side of the ball bearing 40
48 Second side of the ball bearing 40
50 Ball set
52 Cone angle
54 Axial direction, width direction
56 Radial direction
58 Axial center of a ball pocket 8
60 Mean radial height of a web 18
62 Center point M of the (two-part) ball bearing cage or of the (two-part) snap cage 2 or of the ball bearing 40
64 Width of a ball pocket 8 (in axial direction/width direction 54)
66 Wall of a ball pocket 8
68 Radius R
70 Elongation
72 Distance, circular arc length (between two adjacent webs 18 of a cage half/cage part 4, 6 on the outer circumference thereof)
74 Distance, circular arc length (between two adjacent webs 18 of a cage half/cage part 4, 6 on the inner circumference thereof)
76 Outer circumference of the inner raceway 42
78 Inner ring shoulder of the inner raceway 42
100 Method for the assembly of the ball bearing 40
102 Moving the balls 10
104 Moving and centering the inner raceway 42
106 Distributing the balls 10
108 Inserting the two cage parts/cage halves 4, 6 one after another and snapping them into the ball set 50

The invention claimed is:

1. A two-part ball bearing cage, comprising:
   two cage parts forming an even-numbered plurality of ball pockets for respectively receiving a corresponding number of balls having a predefined ball diameter;
   each of said cage parts including a ring-shaped body having webs disposed thereon forming said ball pockets, said webs having a width and being distributed in a circumferential direction;
   each of said cage parts having a cylindrical inner circumferential surface in an axial direction and a conical surface in the axial direction, said conical surfaces each being located exclusively on an outer circumferential surface of a respective cage part; and
   each two of said webs disposed adjacent one another in said circumferential direction being spaced apart by a distance in said circumferential direction corresponding approximately to a sum of twice the predefined ball diameter and said width of one of said webs in said circumferential direction.

2. The two-part ball bearing cage according to claim 1, wherein said cage parts are identical, and said webs are distributed uniformly in said circumferential direction.

3. The two-part ball bearing cage according to claim 1, wherein at least one of said cage parts has a cylindrical outer surface in an axial direction.

4. The two-part ball bearing cage according to claim 1, wherein said conical surface has a cone angle between approximately 2° and approximately 20°.

5. The two-part ball bearing cage according to claim 1, wherein said conical surface has a cone angle between approximately 7° and approximately 12°.

6. The two-part ball bearing cage according to claim 1, wherein at least one of said cage parts is formed at least in part of plastic material.

7. The two-part ball bearing cage according to claim 6, wherein said plastic material is polyether ether ketone, polyether ketone, polyphenylene sulfide, polyamidimide, Polyimide, phenol resin or cotton-fabric-reinforced phenol resin.

8. The two-part ball bearing cage according to claim 1, wherein said two cage parts are formed of an identical material or identical materials or at least in part or completely of different materials.

9. The two-part ball bearing cage according to claim 1, wherein each two of said adjacent webs are spaced apart by a distance on said outer circumference that is greater than a distance on said inner circumference.

10. The two-part ball bearing cage according to claim 1, wherein said cage parts are cut, additively manufactured, 3D-printed or injection molded.

11. A single-row radial deep groove ball bearing, comprising a two-part ball bearing cage according to claim 1.

12. A ball bearing, comprising:
a two-part ball bearing cage according to claim 1;
an inner raceway;
an outer raceway; and
a multiplicity of balls with a predetermined ball diameter, said multiplicity of balls corresponding to said even-numbered plurality ball pockets formed by said two-part ball bearing cage, and each of said balls being received in a respective one of said ball pockets.

13. The ball bearing according to claim 12, wherein said predetermined ball diameter is less than 5 mm.

14. A dental instrument or dental turbine, comprising a ball bearing according to claim 12.

* * * * *